(12) United States Patent
Kang

(10) Patent No.: US 12,055,805 B2
(45) Date of Patent: *Aug. 6, 2024

(54) DISPLAY DEVICE

(71) Applicant: LG ELECTRONICS INC., Seoul (KR)

(72) Inventor: Hyunjung Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 51 days.

This patent is subject to a terminal disclaimer.

(21) Appl. No.: 17/760,353

(22) PCT Filed: Feb. 13, 2020

(86) PCT No.: PCT/KR2020/002002
§ 371 (c)(1),
(2) Date: Aug. 8, 2022

(87) PCT Pub. No.: WO2021/162142
PCT Pub. Date: Aug. 19, 2021

(65) Prior Publication Data
US 2023/0111243 A1     Apr. 13, 2023

(51) Int. Cl.
*G02F 1/1333*     (2006.01)
(52) U.S. Cl.
CPC .. *G02F 1/133314* (2021.01); *G02F 1/133322* (2021.01)
(58) Field of Classification Search
CPC ......... G02F 1/133314; G02F 1/133322; G02F 1/133317; G02F 1/133308
See application file for complete search history.

(56) References Cited

U.S. PATENT DOCUMENTS

| 11,378,832 | B2* | 7/2022 | Lee | G02F 1/133308 |
| 2016/0351144 | A1* | 12/2016 | Park | G02F 1/133514 |
| 2019/0094602 | A1* | 3/2019 | Jung | G02F 1/133603 |
| 2019/0146263 | A1* | 5/2019 | Kim | G02F 1/133308 |
| | | | | 361/809 |

FOREIGN PATENT DOCUMENTS

| KR | 20180118842 A | * | 4/2017 |
| KR | 1020170049235 | | 5/2017 |
| KR | 1020170123820 | | 11/2017 |
| KR | 20180118842 A | * | 11/2018 |

(Continued)

OTHER PUBLICATIONS

English translation of KR-20180118842-A, Oh (Year: 2017).*

(Continued)

*Primary Examiner* — Jonathan Y Jung
(74) *Attorney, Agent, or Firm* — LEE, HONG, DEGERMAN, KANG & WAIMEY

(57) ABSTRACT

Disclosed is a display device. The display device of the present disclosure includes a display panel; a frame which is located in a rearward direction of the display panel, and has an accommodating portion facing a rear surface of the display panel and an extension portion extending from the accommodating portion toward a side surface of the display panel; a holder fixed to a rear surface of the extension portion of the frame; and a back cover located in a rearward direction of the frame.

10 Claims, 31 Drawing Sheets

(56) References Cited

FOREIGN PATENT DOCUMENTS

| KR | 1020180118842 | 11/2018 |
| KR | 1020190034969 | 4/2019 |
| KR | 1020190048485 | 5/2019 |
| KR | 10-2019-0134046 | 12/2019 |

OTHER PUBLICATIONS

PCT International Application No. PCT/KR2020/002002, International Search Report dated Oct. 15, 2020, 2 pages.
Korean Intellectual Property Office Application No. 10-2022-7030661, Office Action dated Feb. 16, 2024, 7 pages.

\* cited by examiner

DISPLAY DEVICE

CROSS-REFERENCE TO RELATED APPLICATION(S)

This application is the National Stage filing under 35 U.S.C. 371 of International Application No. PCT/KR2020/002002, filed on Feb. 13, 2020, the contents of which are all incorporated by reference herein in its entirety.

TECHNICAL FIELD

The present disclosure relates to a display device.

BACKGROUND ART

As the information society develops, the demand for display devices is also increasing in various forms. In response to this, various display devices such as Liquid Crystal Display Device (LCD), and Organic Light Emitting Diode (OLED) have been researched and used in recent years.

A liquid crystal panel of the LCD includes a liquid crystal layer, and a TFT substrate and a color filter substrate facing each other with the liquid crystal layer interposed therebetween, and may display an image by using light provided from a backlight unit.

An OLED panel can display an image by depositing an organic material layer that can emit light by itself on a substrate on which a transparent electrode is formed. The OLED panel may have flexible characteristics as well as a thin thickness.

Recently, research on improving an assembly structure of the display device while securing the rigidity of the display device has been actively conducted.

DISCLOSURE

Technical Problem

An object of the present disclosure is to solve the above and other problems.

Another object may be to provide a rigid structure of a display device.

Another object may be to provide an easy coupling structure of a display device.

Technical Solution

According to an aspect of the present disclosure to achieve the above or other objects, the display device includes a display panel; a frame which is located in a rearward direction of the display panel, and has an accommodating portion facing a rear surface of the display panel and an extension portion extending from the accommodating portion toward a side surface of the display panel; a holder fixed to a rear surface of the extension portion of the frame; and a back cover located in a rearward direction of the frame, wherein the back cover includes: a base portion facing a rear surface of the frame; a connecting portion extending from the base portion while being bent toward the holder; a coupling portion which is curled from a distal end of the connecting portion toward an inner surface of the connecting portion, and is coupled to the holder; and a reinforcing part which faces an inner surface of the connecting portion and extends from the coupling portion.

Advantageous Effects

The effect of the display device according to the present disclosure will be described as follows.

According to at least one of embodiments of the present disclosure, a rigid structure of the display device may be provided.

According to at least one of embodiments of the present disclosure, an easy coupling structure of the display device may be provided.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

MODE FOR INVENTION

In the following description, the same or similar components are assigned the same reference numbers, and overlapping descriptions with respect to the same reference numbers may be omitted.

In the following description, even if embodiment is described with reference to specific drawings, if necessary, reference numbers that do not appear in the specific drawings may be referred to, and the reference numbers that do not appear in the specific drawings are used only when the reference numbers appear in the remaining drawings.

Terms such as first and second used in the following description may be used. These terms are only for distinguishing the elements from other elements, and the essence, sequence, or order of the elements are not limited by the terms.

In the following description, suffixes such as "module" and "unit" may be used to refer to elements or components. Use of such suffixes herein is merely intended to facilitate description of the specification, and the suffixes do not have any special meaning or function.

In the following description, when it is described that a first component is 'connected', 'coupled', 'mounted', 'fastened', 'contacted' or 'connected' to a second component, it means that a third component is 'connected', 'coupled', 'mounted', 'fastened', 'contacted' or 'connected' between the first component and the second component, as well as that the first component is directly 'connected', 'coupled', 'mounted', 'fastened', 'contacted' or 'connected' to the second component.

In the following description, when it is determined that a detailed description of a well-known technology may obscure the gist of an embodiment of the present disclosure, a detailed description of the well-known technology may be omitted.

In the following description, the accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, a liquid crystal panel (LCD) will be described as an example for a display panel, but the display panel applicable to the present disclosure is not limited to the liquid crystal panel.

Figure 1:
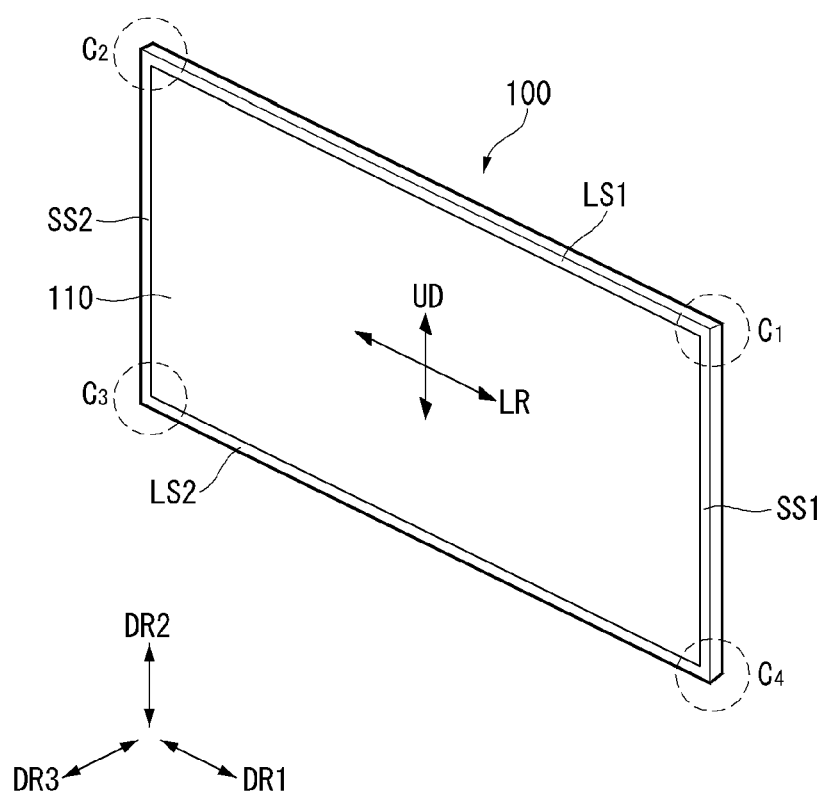
FIGS. 1 to 31 are diagrams illustrating examples of a display device according to embodiments of the present disclosure.

Referring to FIG. 1, hereinafter, a display device may include a first long side LS1, a second long side LS2 facing the first long side LS1, a first short side SS1 adjacent to the first long side LS1 and the second long side LS2, and a second short side SS2 facing the first short side SS1.

Here, the first short side area SS1 may be referred to as a first side area, the second short side area SS2 may be referred to as a second side area facing the first side area, the first long side area LS1 may be referred to as a third side area which is adjacent to the first side area and the second side area and located between the first side area and the second side area, and the second long side area LS2 may be referred to as a fourth side area which is adjacent to the first side area and the second side area, located between the first side area and the second side area, and faces the third side area.

In addition, for convenience of explanation, it is illustrated that the lengths of the first and second long sides LS1 and LS2 are longer than the lengths of the first and second short sides SS1 and SS2, but it may be possible that the lengths of the first and second long sides LS1 and LS2 are approximately the same as the lengths of the first and second short sides SS1 and SS2.

In addition, hereinafter, a first direction DR1 may be a direction parallel to the long side LS1, LS2 of the display panel 100, and a second direction DR2 may be a direction parallel to the short side SS1, SS2 of the display panel 100. A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

A side on which a display device displays an image may be referred to as a forward direction or a front side or front surface. When a display device displays an image, the side from which an image cannot be observed may be referred to as a rearward direction or a rear side or rear surface. When the display is viewed from a forward direction or the front side, the side of the first long side LS1 may be referred to as an upper side or an upper surface. Similarly, the side of the second long side LS2 may be referred to as a lower side or a lower surface. Similarly, the side of the first short side SS1 may be referred to as a right side or a right surface, and the side of the second short side SS2 may be referred to as a left side or a left surface.

In addition, the first long side LS1, the second long side LS2, the first short side SS1, and the second short side SS2 may be referred to as an edge of the display device 1. In addition, a point where the first long side LS1, the second long side LS2, the first short side SS1, and the second short side SS2 meet each other may be referred to as a corner. For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Here, a direction from the first short side SS1 toward the second short side SS2 or a direction from the second short side SS2 toward the first short side SS1 may be referred to as a left-right direction LR. A direction from the first long side LS1 toward the second long side LS2 or a direction from the second long side LS2 toward the first long side LS1 may be referred to as a up-down direction UD.

Figure 2:
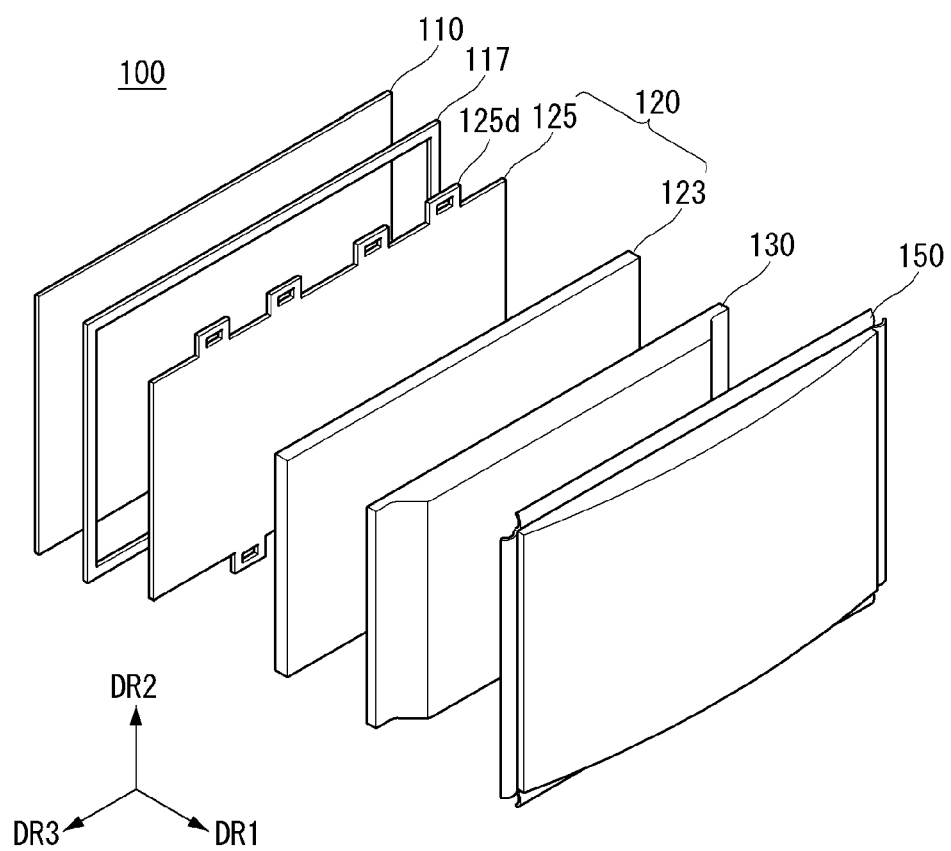

Referring to FIGS. 1 and 2, a display panel 110 is located in a forward direction of the display device 100, and may display an image. The display panel 110 may include a plurality of pixels to output an image by matching color, brightness, and saturation for each pixel.

The display panel 110 may be divided into an active area which displays an image and an inactive area which does not display an image. The display panel 110 may include a front substrate and a rear substrate facing each other with a liquid crystal layer interposed therebetween.

The front substrate may include a plurality of pixels including red R, green G, and blue B sub-pixels. The front substrate may generate light corresponding to a color of red, green, or blue according to a control signal.

The rear substrate may include switching elements. The rear substrate may switch a pixel electrode. For example, the pixel electrode may change the molecular arrangement of the liquid crystal layer according to an externally applied control signal. The liquid crystal layer may include liquid crystal molecules. The liquid crystal molecules may change their arrangement in response to a voltage difference generated between the pixel electrode and a common electrode. The liquid crystal layer may transmit light provided from a backlight unit 120 to the front substrate.

A guide panel 117 may be located in the rearward direction of the display panel 110. The guide panel 117 may support a portion of the rear surface of the display panel 110. The guide panel 117 may be in contact with the outside of the display panel 110. The guide panel 117 may be coupled to a frame 130.

A backlight unit 120 may be located in the rearward direction of the display panel 110. The backlight unit 120 may include a plurality of light sources. The light source of the backlight unit 120 may be a direct type or an edge type. In the case of an edge type backlight unit 120, a light guide portion or a light guide panel (LGP) may be further included.

The backlight unit 120 may be located in the forward direction of the frame 130. For example, it means that a plurality of light sources may be disposed on the front surface of the frame 130, and this may be collectively referred to as a direct type backlight unit.

The backlight unit 120 may be driven by a full driving method or a partial driving method such as local dimming or impulsive. The backlight unit 120 may include an optical sheet 125 and a light source portion 123.

The optical sheet 125 may diffuse the light of the light source. The optical sheet 125 may be composed of a plurality of layers. For example, the optical sheet 125 may include at least one prism sheet and/or at least one diffusion sheet.

The optical sheet 125 may include at least one coupling portion 125*d*. Although not shown, the coupling portion 125*d* may be coupled to a back cover 150. That is, the coupling portion 125*d* means that it can be directly coupled to the back cover 150. Alternatively, the coupling portion 125*d* may be coupled to a structure coupled to the back cover 150. That is, it means that the coupling portion 125*d* may be indirectly coupled to the back cover 150. Alternatively, the coupling portion 125*d* may be fixed by the back cover 150 and a mechanism. Alternatively, the coupling portion 125d may be omitted, and in this case, the optical sheet 125 may be seated by other mechanism and fixed at a preset location by an adhesive member or the like.

The light source portion 123 may include a light source, or the like. Details of the light source portion 123 will be described in a corresponding section. The frame 130 may support components of the display device 100. For example, the backlight unit 120 and the like may be coupled to the frame 130. The frame 130 may be made of a metal material such as an aluminum alloy.

The back cover 150 may be located in the rearward direction of the display device 100. The back cover 150 may protect the internal configuration from the outside. At least a portion of the back cover 150 may be coupled to the frame 130. The back cover 150 may be an injection molding made of a resin material.

The frame 130 and the back cover 150 may be fixed to each other through at least one fastening structure. Details of the coupling structure between the frame 130 and the back cover 150 will be described in a corresponding section.

Figure 3:
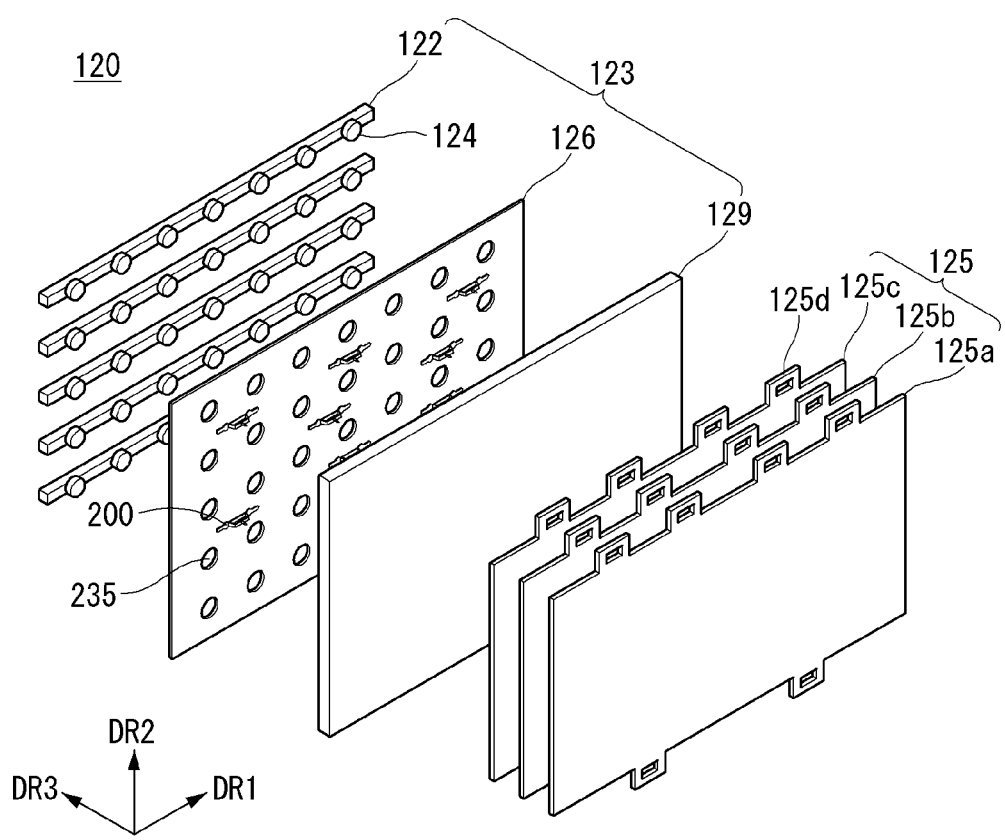

Referring to FIG. 3, the backlight unit 120 may include a light source portion 123 including a substrate 122, at least one optical assembly 124, a reflective sheet 126, and a diffusion plate 129, and an optical sheet 125 located in the forward direction of the light source portion 123. The components of the backlight unit 120 are not limited thereto, and any one or more of them may be omitted.

The substrate 122 may be configured in the form of a plurality of straps that extend in a first direction and are spaced apart from each other by a certain distance in a second direction perpendicular to the first direction.

At least one optical assembly 124 may be mounted on the substrate 122. An electrode pattern for connecting an adapter and the optical assembly 124 may be formed on the substrate 122. For example, the electrode pattern may be a carbon nano tube (CNT) electrode pattern.

The substrate 122 may be formed of at least one of polyethylene terephthalate (PET), glass, polycarbonate (PC), and silicon. The substrate 122 may be a printed circuit board (PCB).

The optical assembly 124 may have a certain interval in the first direction and may be disposed on the substrate 122. A diameter of the optical assembly 124 may be greater than a width of the substrate 122. That is, the diameter of the optical assembly 124 may be greater than the length of the substrate 122 in the second direction.

The optical assembly 124 may be a light emitting diode (LED) chip or a light emitting diode package including at least one light emitting diode chip.

The optical assembly 124 may be formed of a colored LED or a white LED that emits at least one color among colors such as red, blue, and green. The colored LED may include at least one of a red LED, a blue LED, and a green LED.

A light source included in the optical assembly 124 may be a chip on board (COB) type. The COB type may be a form in which an LED chip, which is a light source, is directly coupled to the substrate 122. This can simplify the manufacturing process. In addition, the resistance can be lowered, thereby reducing a heat energy lost. That is, it means that the power efficiency of the optical assembly 124 can be enhanced. The COB type can provide brighter lighting. The COB type may provide a thinner thickness and lighter weight than a conventional one.

The reflective sheet 126 may be located on the front surface of the substrate 122. The reflective sheet 126 may have a through hole 235, and the optical assembly may be inserted into the through hole 235.

The reflective sheet 126 may reflect a light provided from the optical assembly 124. In addition, the reflective sheet 126 may reflect the light reflected from the diffusion plate 129 back toward the diffusion plate 129.

The reflective sheet 126 may include at least one of metal and metal oxide which are a reflective material. For example, the reflective sheet 126 may include a metal having a high reflectance such as at least one of aluminum Al, silver Ag, gold Au, and titanium dioxide TiO2 and/or a metal oxide.

The reflective sheet 126 may be formed by depositing and/or coating a metal or a metal oxide on the substrate 122. Ink including a metallic material may be printed on the reflective sheet 126. A deposition layer using a vacuum deposition method such as a thermal deposition method, an evaporation method, or a sputtering method may be formed on the reflective sheet 126. A coating layer and/or a print layer using a printing method, a gravure coating method, or a silk screen method may be formed on the reflective sheet 126.

An air gap may be located between the reflective sheet 126 and the diffusion plate 129. The air gap may serve as a buffer through which light emitted from the optical assembly 124 may be widely spread. In order to maintain the air gap, a supporter 200 may be located between the reflective sheet 126 and the diffusion plate 129.

A resin may be deposited on the optical assembly 124 and/or the reflective sheet 126. The resin may diffuse light emitted from the optical assembly 124. The diffusion plate 129 may diffuse light emitted from the optical assembly 124 upward.

The optical sheet 125 may be located in the forward direction of the diffusion plate 129.

The rear surface of the optical sheet 125 may face the diffusion plate 129, and the front surface of the optical sheet 125 may face the rear surface of the display panel 110.

The optical sheet 125 may include at least one sheet. Specifically, the optical sheet 125 may include one or more prism sheets and/or one or more diffusion sheets. A plurality of sheets included in the optical sheet 125 may be in an adhesive and/or closely contacted state.

The optical sheet 125 may be composed of a plurality of sheets having different functions. For example, the optical sheet 125 may include first to third optical sheets 125a to 125c. The first optical sheet 125a may have a function of a diffusion sheet, and the second and third optical sheets 125b and 125c may have a function of a prism sheet. The number and/or location of the diffusion sheet and the prism sheet may be changed.

The diffusion sheet may prevent light emitted from the diffusion plate from being partially concentrated, thereby making light distribution to be more uniform. The prism sheet may collect light emitted from the diffusion sheet so that the light is vertically incident on the display panel 110.

The coupling portion 125d may be formed in at least one of one side or an edge of the optical sheet 125. The coupling portion 125d may be formed in at least one of the first to third optical sheets 125a to 125c.

The coupling portion 125d may be formed in a long side or an edge of the optical sheet 125. The coupling portion 125d formed in the first long side and the coupling portion 125d formed in the second long side may be asymmetric. For example, it means that the location and/or the number of the coupling portion 125d of the first long side and the coupling portion 125d of the second long side may be different from each other.

Figure 4:
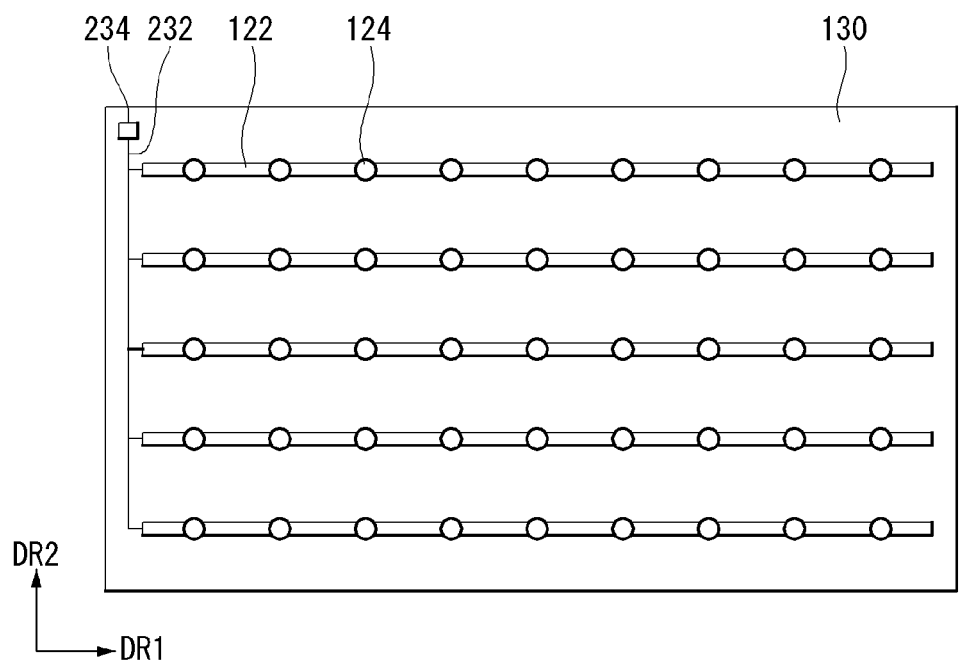

Referring to FIG. 4, a substrate 122 including a plurality of straps that extend in a first direction and are spaced apart from each other by a certain distance in a second direction perpendicular to the first direction may be provided on the frame 130. One side of the plurality of substrates 122 may be connected to a wiring electrode 232.

The wiring electrode 232 may extend in the second direction. The wiring electrode 232 may be connected to one side of the substrate 122 at regular intervals in the second direction.

A wiring hole 234 may be formed in one end of the wiring electrode 232. The wiring hole 234 may be a fine hole passing through the frame 130. Through the wiring hole 234, the wiring electrode 232 may extend to the rear surface of the frame 130. Through the wiring hole 234, the wiring electrode 232 may be electrically connected to an adapter (not shown) located on the rear surface of the frame 130.

The optical assembly 124 may be mounted on the substrate 122 at a certain interval in the first direction. A diameter of the optical assembly 124 may be greater than a width of the substrate 122 in the second direction.

Figure 5:
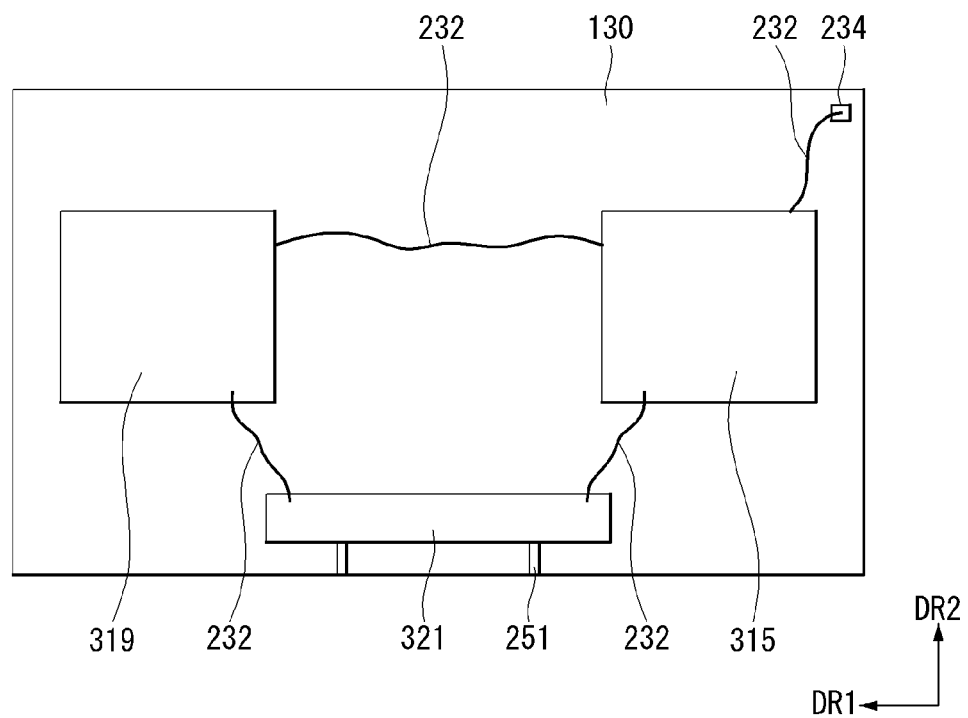

Referring to FIG. 5, the wiring electrode 232 extending from the front surface of the frame 130 may be electrically connected to a power supply 315. The power supply 315 may be a printed circuit board that supplies power to the display device 100. The power supply 315 may change AC power to DC power.

The power supply 315 may supply current to the optical assembly 124 through the wiring electrode 232. The power supply 315 may be electrically connected to a main board 321 through the wiring electrode 232. The main board 321 may be spaced apart from the power supply 315 by a certain interval.

The main board 321 may be a printed circuit board that provides an interface for the display device 100 to operate. In addition, the main board 321 may check and manage operation states of each component of the display device 100.

The main board 321 and the power supply 315 may be electrically connected to a T-con board 319 through the wiring electrode 232. The T-con board 319 may be a printed circuit board that transmits power or a signal input from the main board 321 or the power supply 315 to the display panel 110. The T-con board 319 may be electrically connected to the display panel 110 in front surface of the frame 130 through a Flat Flex Cable (FFC) 251.

Each of the printed circuit boards is illustrated as being connected to each other, but not limited thereto, and only at least a portion of each of the printed circuit boards may be connected to each other.

Figure 6:
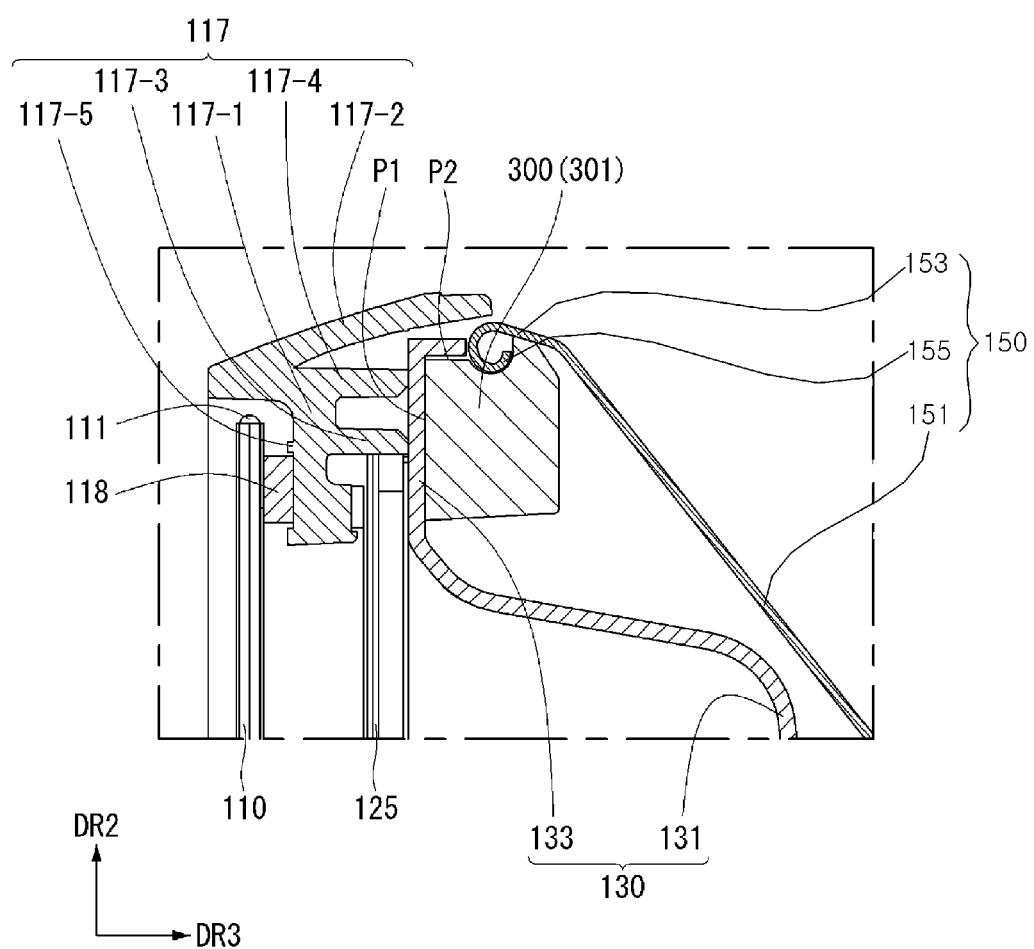
Figure 7:
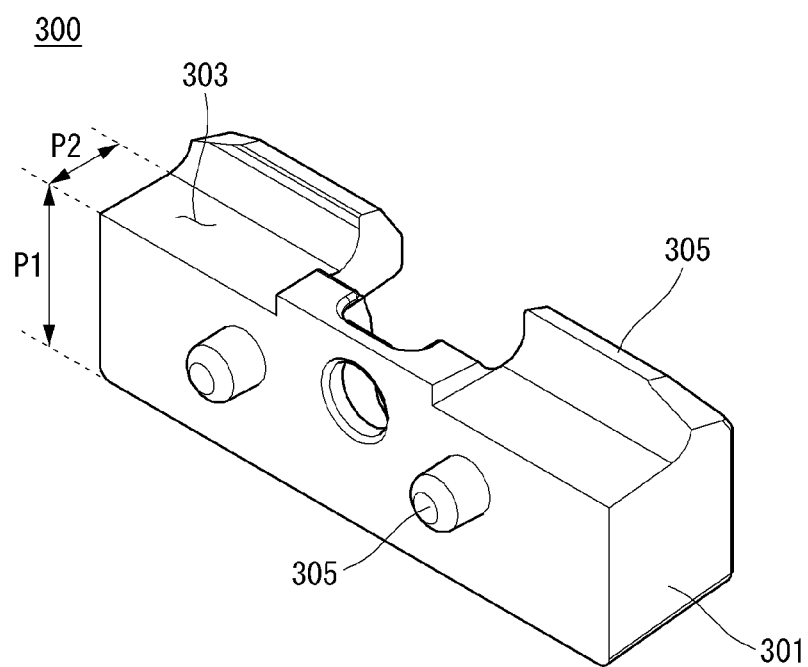

Referring to FIGS. 6 and 7, in order to protect the side surface of the display panel 110 and prevent light leakage, a sealing agent 111 covering the side surface of the display panel may be side sealed. The resin for sealing may include Oligomer, Monomer, Photo-initiator, Additives, and the like.

The guide panel 117 may include a horizontal portion 117-1 and a vertical portion 117-2. The horizontal portion 117-1 may support the edge of the display panel 110 in the rearward direction. The horizontal portion 117-1 may be provided between the display panel 110 and the optical sheet 125 to maintain a constant interval between the display panel 110 and the optical sheet 125 according to optical characteristics.

The display panel 110 and the guide panel 117 may be fixed to each other by an adhesive layer 118. The adhesive layer 118 may be located between the edge of the display panel 110 and the horizontal portion 117-1 of the guide panel 117. The adhesive layer 118 may perform a function of restraining and limiting the mutual movement of the display panel 110 and the guide panel 117, and a function of buffering an external force provided. In addition, the adhesive layer 118 may include a light blocking material to prevent light from leaking to the edge of the display panel 110, thereby serving as a light blocking member. In order to prevent separation of the adhesive layer 118, at least one protrusion 117-5 may be provided in the horizontal portion 117-1. Protrusions 117-5 are disposed in at least one side of the adhesive layer 118 to serve as a stopper.

The vertical portion 117-2 may extend from one side of the horizontal portion 117-1. The vertical portion 117-2 may extend long to cover the side surface of the display panel 110. In addition, the vertical portion 117-2 may extend long to cover at least a portion of a bracket 150 and the frame 130 which will be described later. In this case, since the frame 130 and the bracket 150 are not exposed by the vertical portion 117-2, they may not be visually recognized from the outside.

The guide panel 117 may further include at least one rib 117-3, 117-4. The rib 117-3, 117-4 may extend from the horizontal portion 117-1 toward the frame 130. The rib 117-3, 117-4 may be placed on the frame 130, in particular, an extension portion 133 of the frame 130.

The frame 130 may include an accommodating portion 131 and an extension portion 133. The accommodating portion 131 may accommodate the components of the display device therein. For example, the accommodating portion 131 may provide an internal space for accommodating the light source portion 123 (refer to FIG. 3). The extension portion 133 may extend outwardly from at least one side of the accommodating portion 131.

The back cover 150 may be disposed to surround the frame 130 in the rearward direction of the frame 130. The back cover 150 may be connected to the frame 130 through a bracket 300, and its movement may be constrained and restricted within a preset range. That is, the back cover 150 may be fixed to the frame 130 via the bracket 300. The bracket 300 may be referred to as a holder 300.

For example, the bracket 300 may be disposed in an internal space provided between the frame 130 and the back cover 150. The bracket 300 may include a body 301 having a preset shape. The body 301 includes at least a first surface P1 and a second surface P2. That is, the first surface P1 and the second surface P2 may refer to different surfaces among surfaces that determine the outer shape of the body 301.

The first surface P1 of the body 301 may be opposite to or facing the extension portion 133 of the frame 130. That is, the first surface P1 may be a surface opposite to the rear surface of the extension portion 133. Alternatively, the first surface P1 may be a surface in contact with at least a portion of the rear surface of the extension portion 133. In this way, when the extension portion 133 and the bracket 300 come into contact with each other in a surface-to-surface manner, it may be easy to maintain a state in which the extension portion 133 is placed on the first surface P1 of the body 301. The first surface P1 may be referred to as an upper surface of the body 301. The bracket 300 and the frame 130 are fixed to each other through a preset fastening structure.

Figure 8:
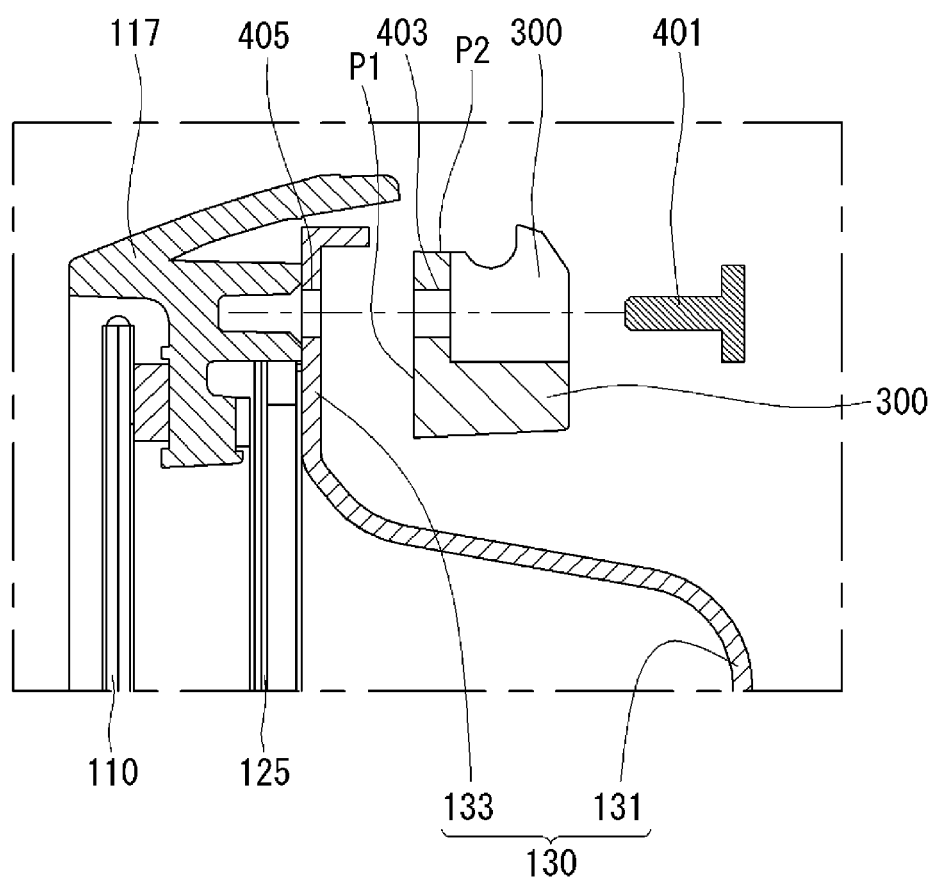
Figure 9:
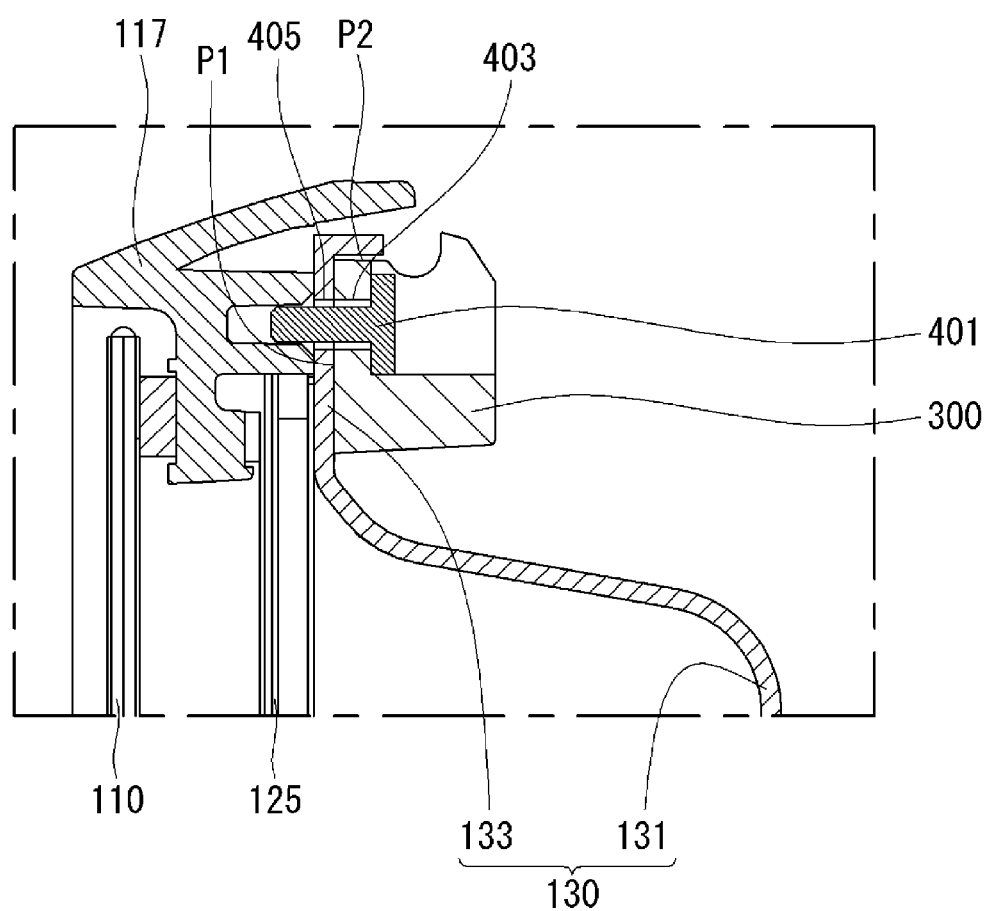

Referring to FIGS. 8 and 9, the frame 130 and the bracket 300 may be mutually fixed through at least one screw 401. For example, the body 301 of the bracket 300 (refer to FIG.

7) and the extension portion 133 of the frame 130 may include a first screw hole 403 and a second screw hole 405 opened along one direction, respectively, and the bracket 300 and the frame 130 may be mutually fixed through the screws 401 fastened to the first screw hole 403 and the second screw hole 405. Here, the fastening direction of the screw 401 may be a vertical direction intersecting an extending direction of the extension portion 133.

Figure 10:
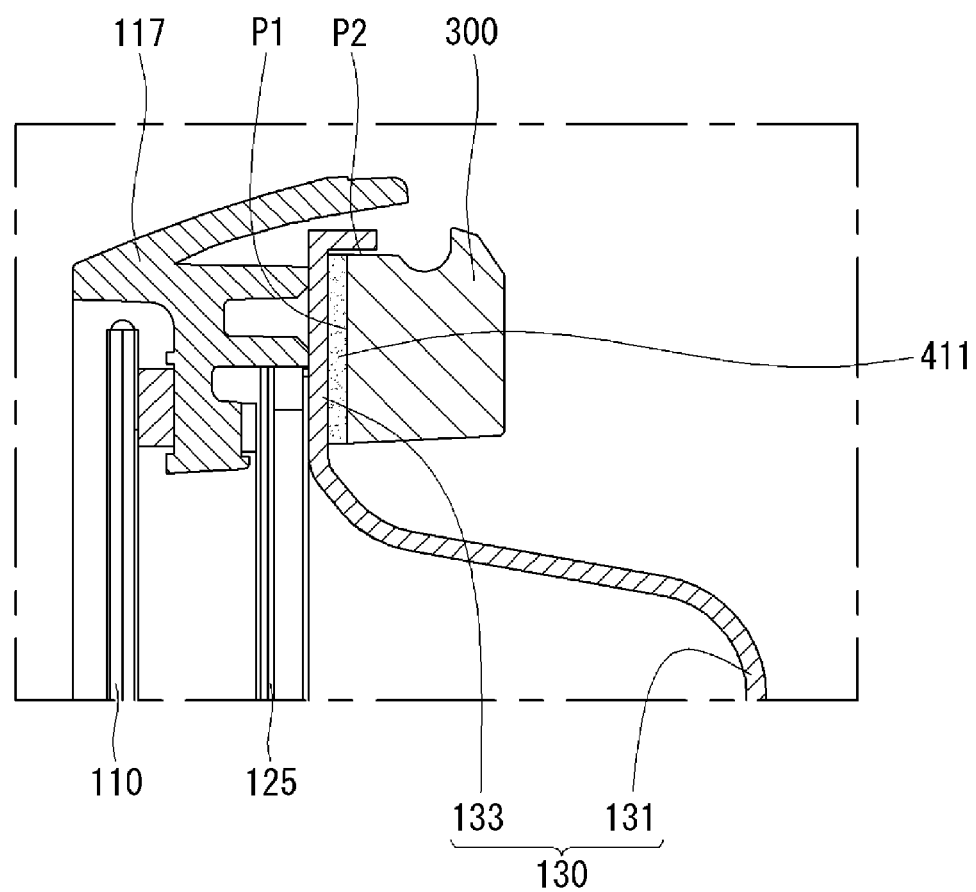

Referring to FIG. 10, the frame 130 and the bracket 300 can be mutually fixed through an adhesive member 411 interposed between the extension portion 133 of the frame 130 and the body 301 (refer to FIG. 7) of the bracket 300. For example, the adhesive member 411 may be a double-sided tape. One surface of the adhesive member 411 may be adhered to the rear surface of the extension portion 133, and the other surface of the adhesive member 411 may be adhered to the first surface P1 of the body 301.

Figure 11:
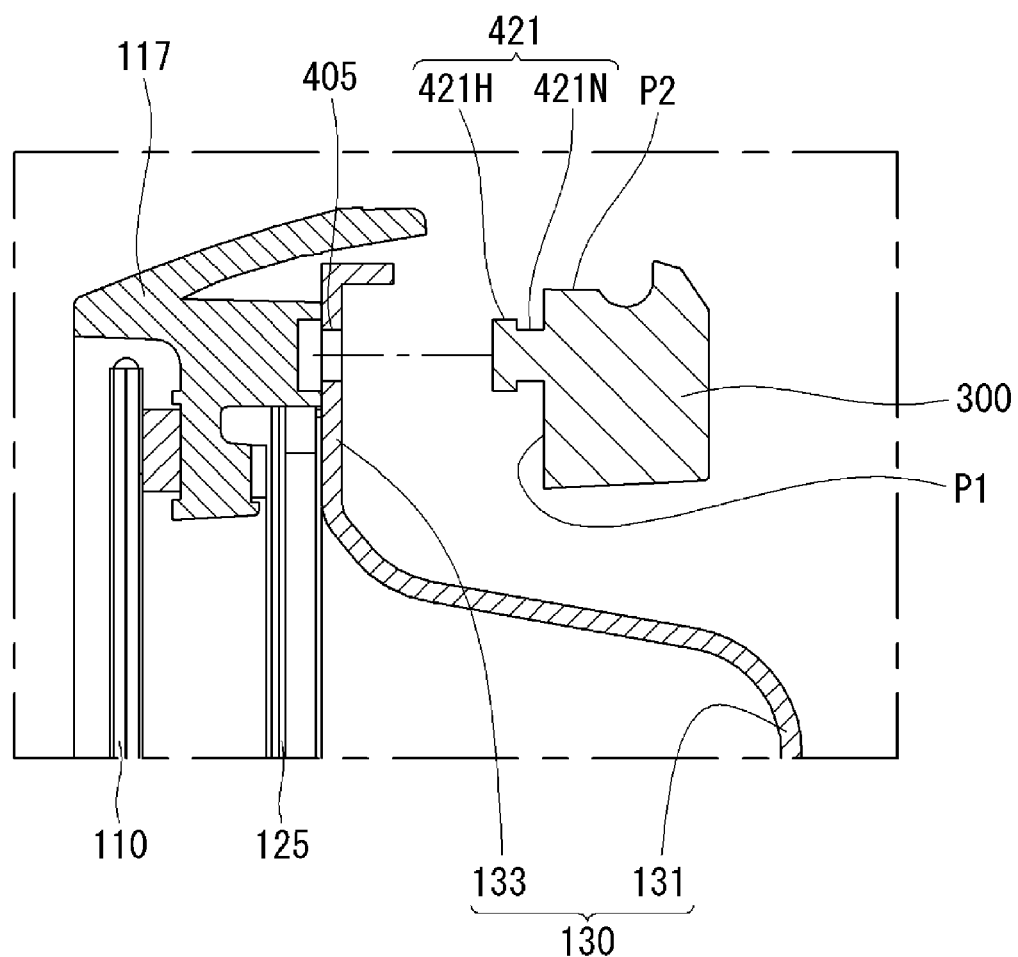
Figure 12:
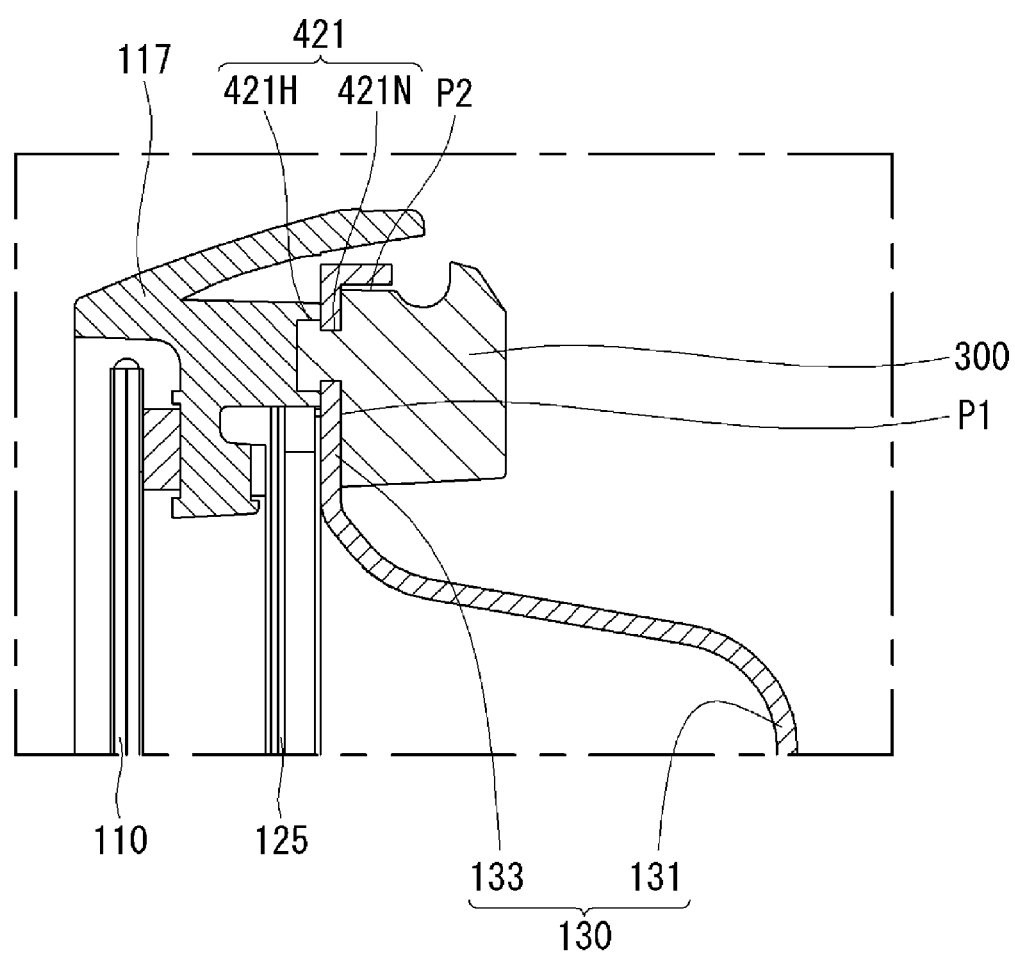

Referring to FIGS. 11 and 12, the frame 130 and the bracket 300 may be fixed to each other through a fitting structure. The bracket 300 may include at least one fixing pin 421, and the extension portion 133 of the frame 130 may include a pinhole 423. For example, the fixing pin 421 may have a shape protruding from the first surface P1 of the body 301 (refer to FIG. 7) toward the extension portion 133. The fixing pin 421 may include a pin head 421H and a pin neck 421N.

The pin head 421H and the pin neck 421N may have a cylindrical shape having different diameters. That is, the pin neck 421N may have a cylindrical shape that extends from the first surface P1 of the body 301 and has a first diameter. The pin head 421H may extend from the pin neck 421N and may have a cylindrical shape having a second diameter greater than the first diameter. The diameter of the pinhole 423 may be set to be greater than or equal to the first diameter, but may be set to be smaller than the second diameter.

The bracket 300 may be formed of a material having a certain ductility. Accordingly, when a certain external force is applied, the pin head 421H may penetrate the pinhole 423. Thereafter, since the movement of the pin head 421H through the pinhole 423 is restricted, the frame 130 and the bracket 300 may maintain a mutual fixing state.

Figure 13:
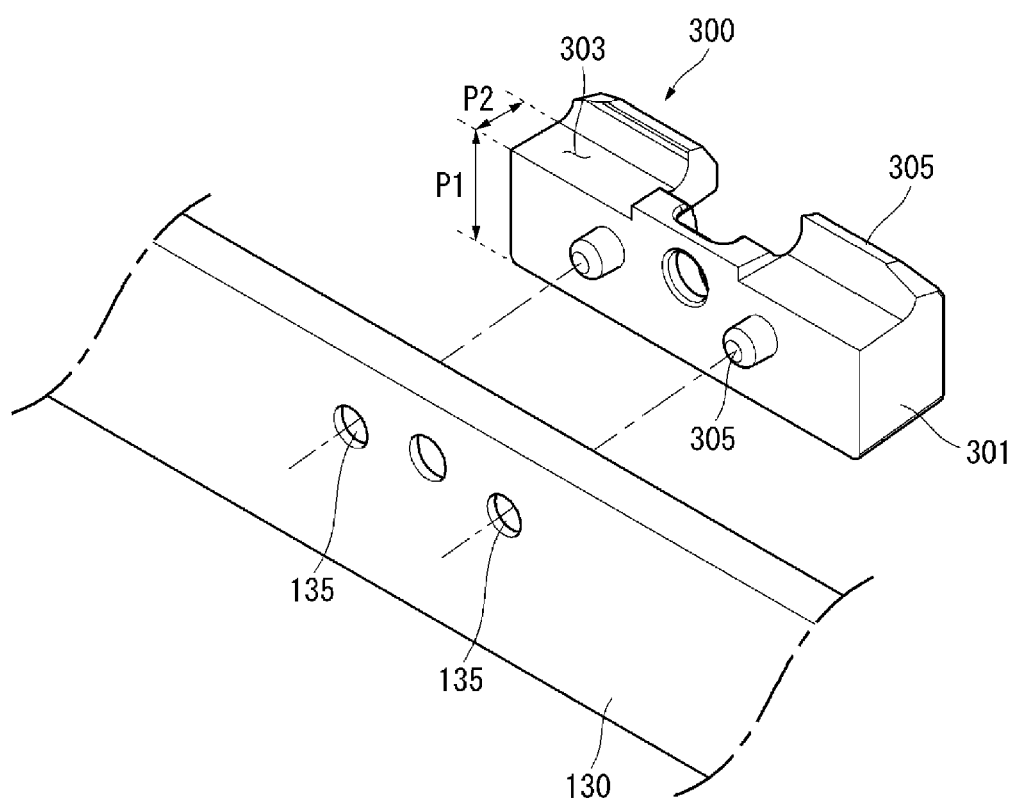
Figure 14:
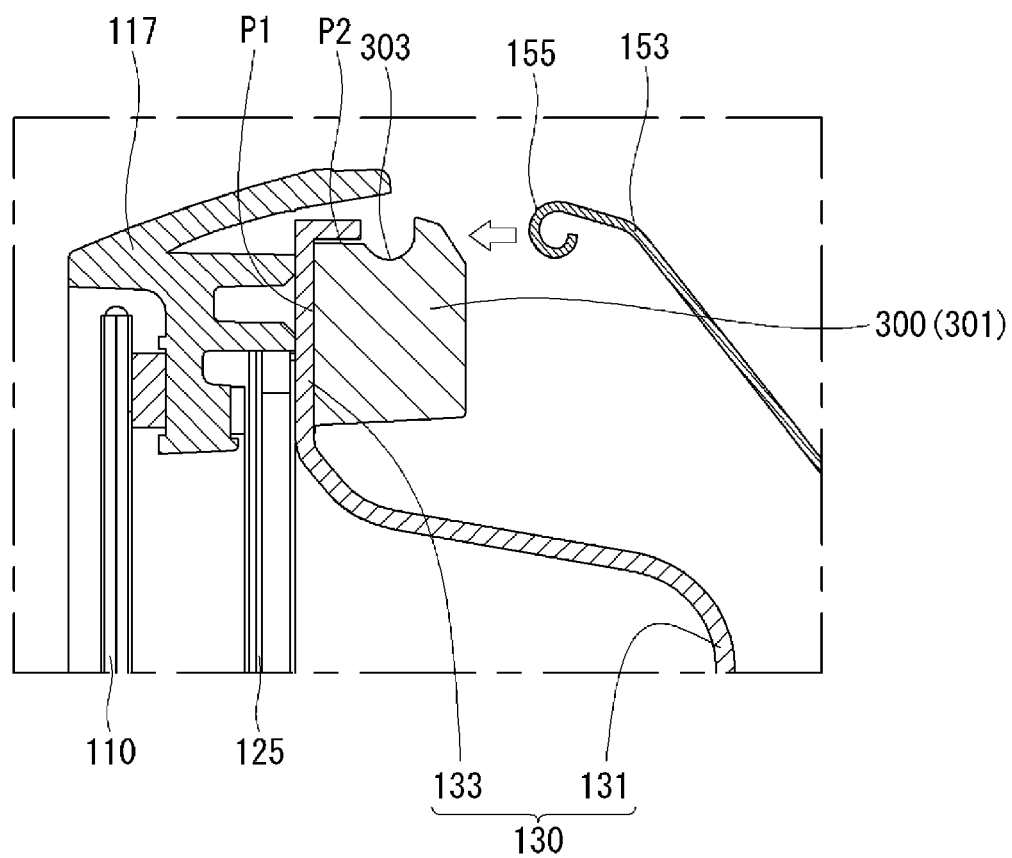
Figure 15:
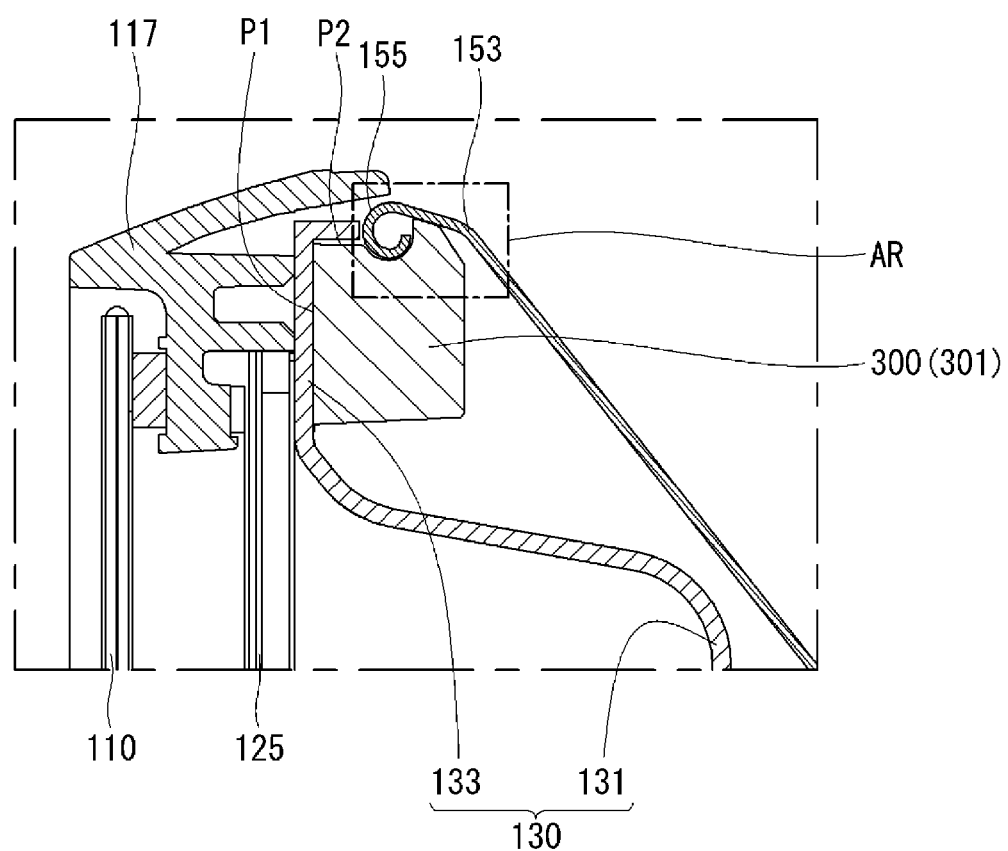
Figure 16:
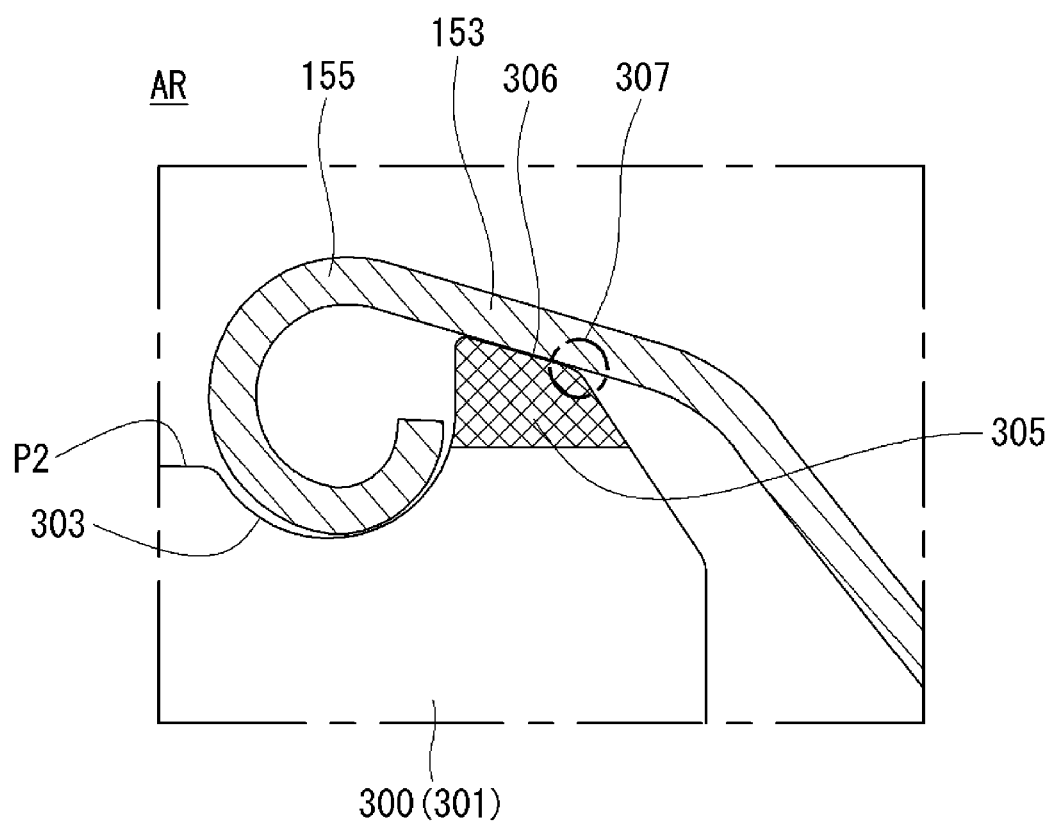
Figure 17:
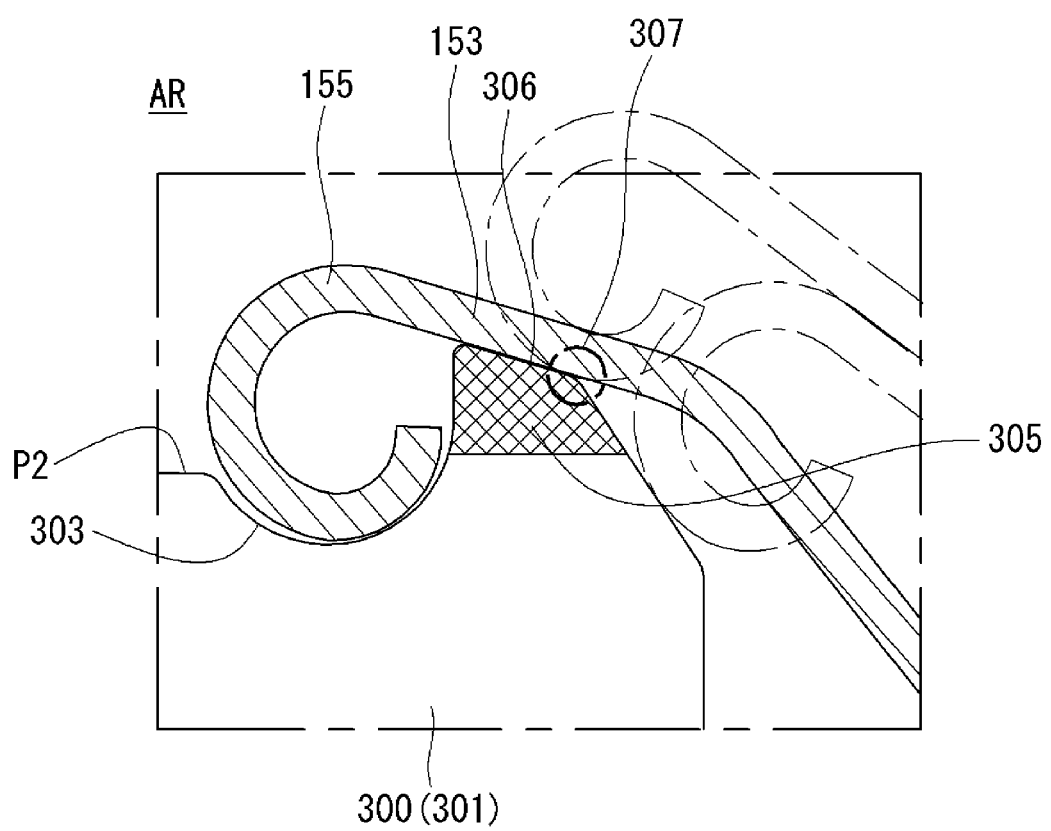

Referring to FIG. 13, the bracket 300 may further include at least one protrusion 305. The extension portion 133 (refer to FIG. 6) of the frame 130 may include an open hole 135 into which the protrusion 305 is drawn. The number of the protrusions 305 and the open holes 135 may correspond to each other. As the protrusion 305 is drawn into the open hole 135, the relative rotation movement (or twisting) of the bracket 300 and the frame 130 may be restricted. Accordingly, there is an advantage that can more effectively constrain the movement of the frame 130 and the bracket 300. Here, the extension direction of the protrusion 305 may be perpendicular to the extension direction of the extension portion 133.

Referring to FIGS. 6 and 7, the second surface P2 of the body 301 may be a surface extending from one edge of the first surface P1 toward the rearward direction. An angle between the first surface P1 and the second surface P2 may be a dutch angle (or a tilt angle). The second surface P2 may be a surface in contact with at least a portion of one end of the back cover 150. The second surface P2 may be referred to as one side surface of the body 301.

The body 301 may include a fitting groove 303. The fitting groove 303 may be provided on the second surface P2 of the body 301. The fitting groove 303 may be provided in a form in which the second surface P2 of the body 301 is partially recessed inward.

The back cover 150 may include a base portion 151, a connecting portion 153, and a coupling portion 155. The base portion 151 may cover the rear surface of the frame 130. The connecting portion 153 is one curved portion of the back cover 150, and may extend from one end of the base portion 151. The connecting portion 153 may cover at least a portion of the second surface P2 of the body 301. The coupling portion 155 may protrude from one end of the connecting portion 153 while being rolled inward toward the bracket 300. The shape of the coupling portion 155 may correspond to a shape of the fitting groove 303. The base portion 151 may be referred to as a first part 151. The connecting portion 153 may be referred to as a second part 153. The coupling portion 155 may be referred to as a third part 155.

The coupling portion 155 may be inserted into the fitting groove 303. Accordingly, the mutual movement of the back cover 150 and the bracket 300 may be restricted and constrained. That is, the bracket 300 and the back cover 150 may be fastened through a snap fit structure using the coupling portion 155 and the fitting groove 303. Here, the protruding direction of the coupling portion 155 may be a horizontal direction intersecting the fastening direction of the screw 401 (refer to FIGS. 8 and 9) and/or the extending direction of the protrusion 305 (refer to FIG. 7).

Accordingly, there is an advantage in that the manufacturing yield can be increased, and the manufacturing time and manufacturing cost can be reduced. In addition, there is an advantage of increasing the convenience of maintenance.

Referring to FIGS. 14 to 17 together with FIG. 7, the back cover 150 may be fastened to the bracket 300 fixed to the frame 130. Accordingly, the back cover 150 may be fixed to the frame 130 via the bracket 300.

The coupling portion 155 of the back cover 150 may be inserted into the fitting groove 303 provided in the body 301 of the bracket 300. The coupling portion 155 may have a curling shape in which one end of the back cover 150 is rolled and wound in a round shape. In this case, since it is possible to improve the rigidity of the coupling portion 155, there is an advantage that can prevent damage to the coupling portion 155 during fitting.

The fitting groove 303 may have a shape corresponding to the shape of the coupling portion 155. For example, when the coupling portion 155 has a curling shape, the curvature constituting the outer shape of the curling shape and the curvature of the fitting groove 303 may correspond. For another example, the curvature constituting the outer circumferential surface of the coupling portion 155 and the curvature of the fitting groove 303 abutting thereto may be the same. In this case, the coupling portion 155 may be firmly fastened to the fitting groove 303. Accordingly, since a clearance between the coupling portion 155 and the fitting groove 303 can be minimized, the damage and noise caused by the clearance between the coupling portion 155 and the fitting groove 303 can be prevented.

The bracket 300 may further include a guide portion 305. The guide portion 305 may extend from the second surface P2 of the body 301, and protrude toward the connecting portion 153 of the back cover 150. The guide portion 305 may serve as a stopper that prevents the coupling portion 155 drawn into the fitting groove 303 from being separated from a preset fixed location.

The guide portion 305 may include a guide surface 306 opposing the connecting portion 153 of the back cover 150.

At least a portion of the guide surface 306 may be in contact with the connecting portion 153 of the back cover 150 in a surface-to-surface manner. In this case, the back cover 150 may be stably seated in the location of the bracket 300.

The guide surface 306 may guide the movement path of the coupling portion 155, when the back cover 150 and the bracket 300 are assembled. To this end, the guide surface 306 may have a bending portion 307. The bending portion 307 may extend inward as it progresses in the rearward direction. That is, the bending portion 307 may be bent one or more times in a preset direction, and the preset direction may face inward as it progresses in the rearward direction. The bending portion 307 is not restricted to the illustrated structure, and may have a multi-bending structure if necessary. In this case, during the fastening process of the bracket 300 and the back cover 150, there is an advantage that the coupling portion 155 can be fitted into the fitting groove 303 with relatively little force. In addition, since the provided external force is reduced, there is an advantage in that damage to the bracket 300 and the back cover 150 can be prevented.

Figure 18:
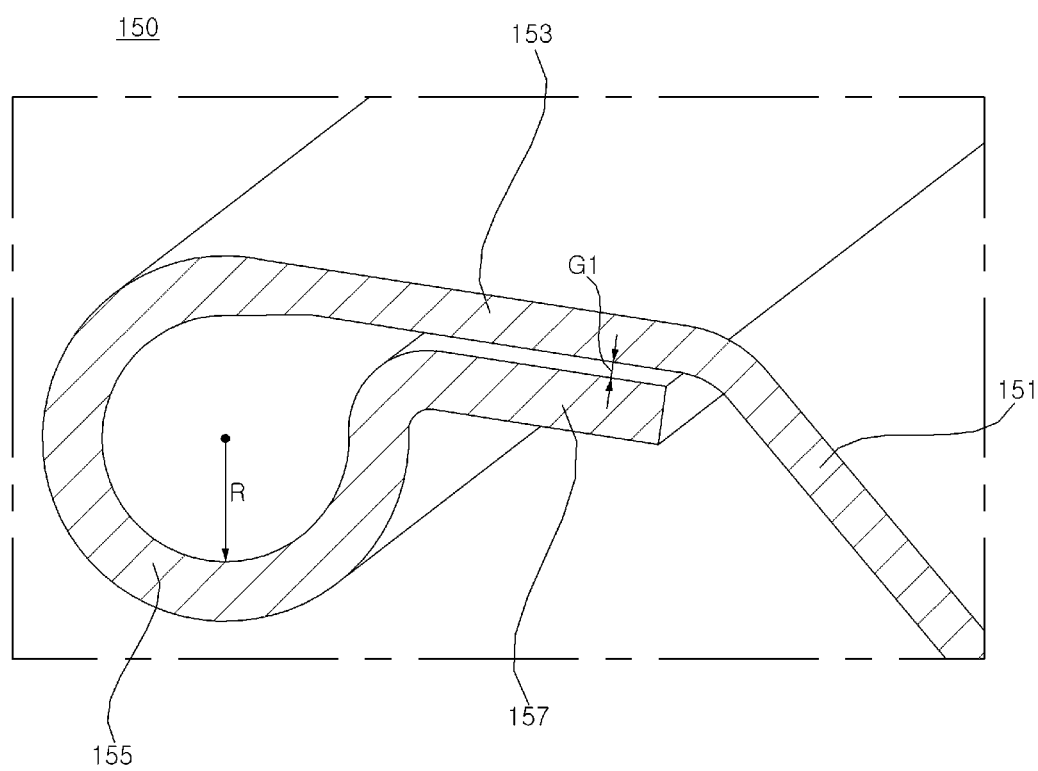

Referring to FIG. 18, the back cover 150 may include a base portion 151, a connecting portion 153, a coupling portion 155, and a reinforcing part 157. The base portion 151 may form a rear surface of the back cover 150. The connecting portion 153 may extend while being bent from the base portion 151. The connecting portion 153 may be bent while forming an obtuse angle with respect to the inner surface of the base portion 151. The connecting portion 153 may form a side surface of the back cover 150. The reinforcing part 157 may be referred to as a fourth part 157.

The coupling portion 155 may extend while being curled from the connecting portion 153. The coupling portion 155 may be curled toward the inner surface of the connecting portion 153 from the connecting portion 153. The coupling portion 155 may be curled while drawing a circle of a constant radius R to be adjacent to the inner surface of the connecting portion 153 from the connecting portion 153.

The reinforcing part 157 may be located adjacent to the inner surface of the connecting portion 153, and may extend from the coupling portion 155 toward the base portion 151 while forming a certain gap G1 with the inner surface of the connecting portion 153. The reinforcing part 157 may face the connecting portion 153 or may be parallel to the connecting portion 153. The reinforcing part 157 may contact the connecting portion 153. Accordingly, the rigidity of the back cover 150 against sagging and torsion may be further improved.

Figure 19:
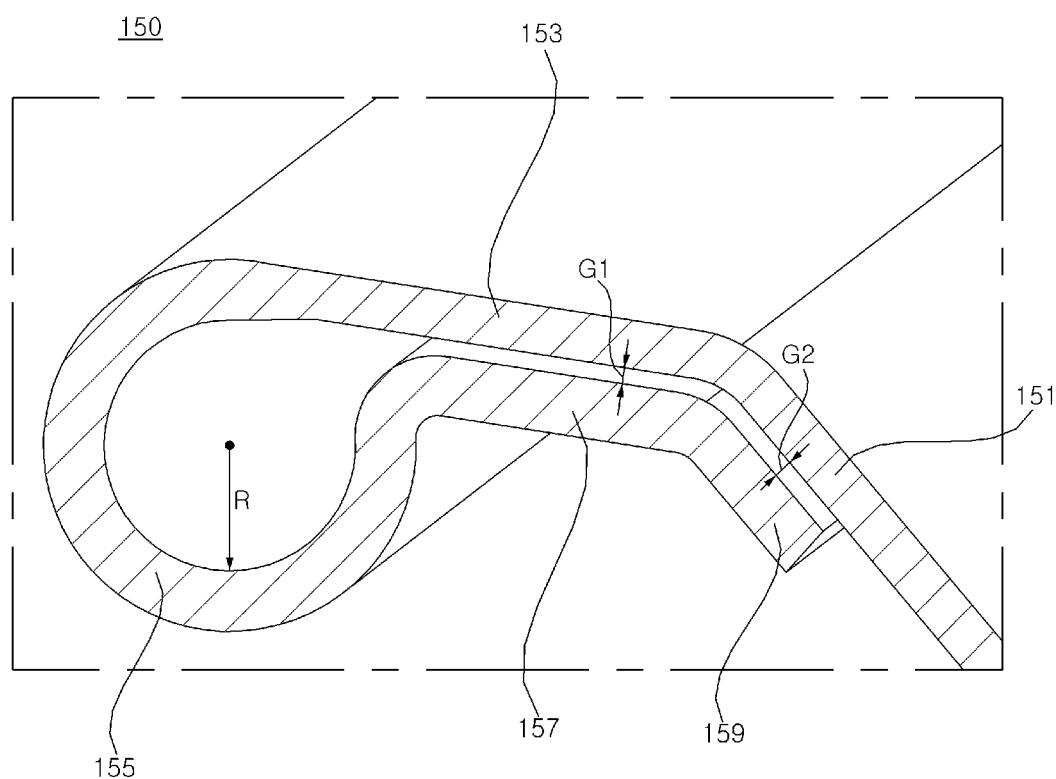

Referring to FIG. 19, the back cover 150 may include a base portion 151, a connecting portion 153, a coupling portion 155, a reinforcing part 157, and a rigid part 159. The rigid part 159 may be referred to as a fifth part 159.

The base portion 151 may form a rear surface of the back cover 150. The connecting portion 153 may extend while being bent from the base portion 151. The connecting portion 153 may be bent while forming an obtuse angle with respect to the inner surface of the base portion 151. The connecting portion 153 may form a side surface of the back cover 150.

The coupling portion 155 may extend while being curled from the connecting portion 153. The coupling portion 155 may be curled toward the inner surface of the connecting portion 153 from the connecting portion 153. The coupling portion 155 may be curled from the connecting portion 153 while drawing a circle of a constant radius R to be adjacent to the inner surface of the connecting portion 153.

The reinforcing part 157 may be located adjacent to the inner surface of the connecting portion 153, and extend from the coupling portion 155 toward the base portion 151 while forming a constant first gap G1 with the inner surface of the connecting portion 153. The reinforcing part 157 may face the connecting portion 153 or may be parallel to the connecting portion 153. The reinforcing part 157 may contact the connecting portion 153.

The rigid part 159 may extend while being bent from the reinforcing part 157. The rigid part 159 may face or extend parallel to the connecting portion 153 and/or the base portion 151. The rigid part 159 may extend from the connecting portion 153 toward the base portion 151 while forming an obtuse angle with respect to the reinforcing part 157. The rigid part 159 may be located adjacent to the inner surface of the base portion 151, and may extend from the reinforcing part 157 while forming a constant second gap G2 with the inner surface of the base portion 151. The second gap G2 may be smaller than the first gap G1. The rigid part 159 may contact the base portion 151. Accordingly, the rigidity of the back cover 150 against sagging and torsion may be further improved.

Figure 20:
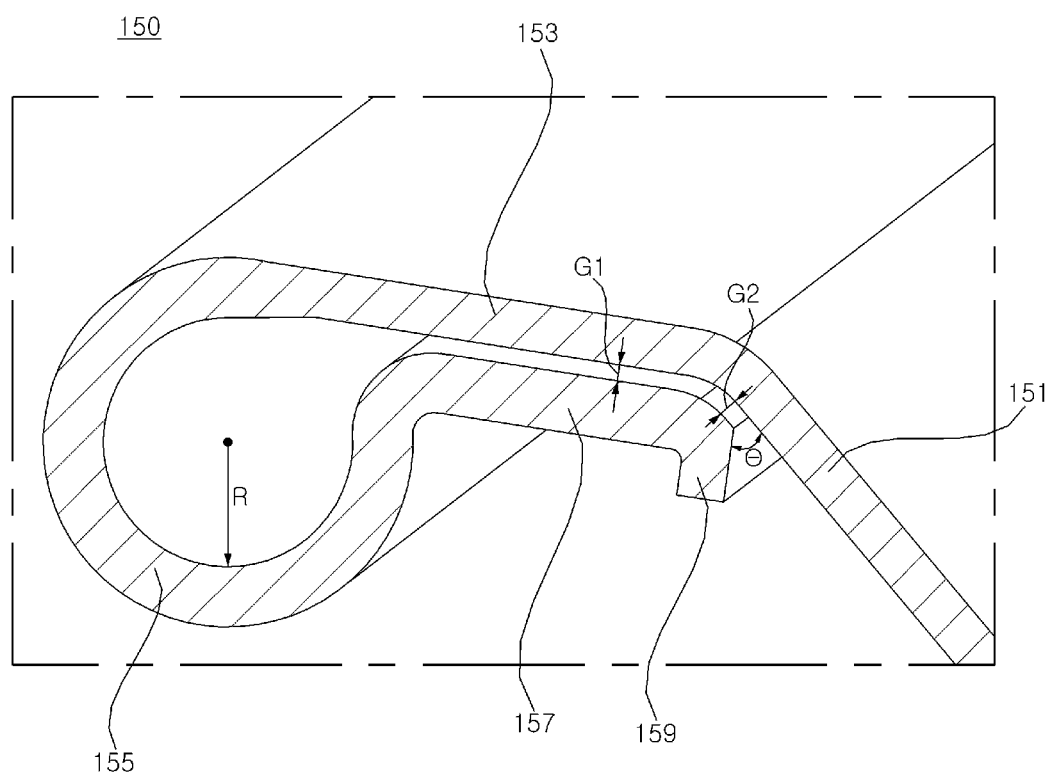

Referring to FIG. 20, the back cover 150 may include a base portion 151, a connecting portion 153, a coupling portion 155, a reinforcing part 157, and a rigid part 159. The base portion 151 may form a rear surface of the back cover 150. The connecting portion 153 may extend while being bent from the base portion 151. The connecting portion 153 may be bent while forming an obtuse angle with respect to the inner surface of the base portion 151. The connecting portion 153 may form a side surface of the back cover 150.

The coupling portion 155 may extend while being curled from the connecting portion 153. The coupling portion 155 may be curled toward the inner surface of the connecting portion 153 from the connecting portion 153. The coupling portion 155 may be curled from the connecting portion 153 while drawing a circle of a constant radius R to be adjacent to the inner surface of the connecting portion 153.

The reinforcing part 157 may be located adjacent to the inner surface of the connecting portion 153, and extend from the coupling portion 155 toward the base portion 151 while forming a constant first gap G1 with the inner surface of the connecting portion 153. The reinforcing part 157 may face the connecting portion 153 or may be parallel to the connecting portion 153. The reinforcing part 157 may contact the connecting portion 153.

The rigid part 159 may extend while being bent from the reinforcing part 157. The rigid part 159 may extend in a direction intersecting the extending direction of the connecting portion 153 and/or the base portion 151. The rigid part 159 may be bent or extended while forming an angle theta with respect to the inner surface of the base portion 151. For example, the angle theta may be an acute angle. The rigid part 159 may be located adjacent to the inner surface of the base portion 151, and may extend or be bent from the reinforcing part 157 while forming a constant second gap G2 with the inner surface of the base portion 151. The second gap G2 may be smaller than the first gap G1. A portion of the rigid part 159 may contact the connecting portion 153 and/or the base portion 151. Accordingly, the rigidity of the back cover 150 against sagging and torsion may be further improved.

Figure 21:
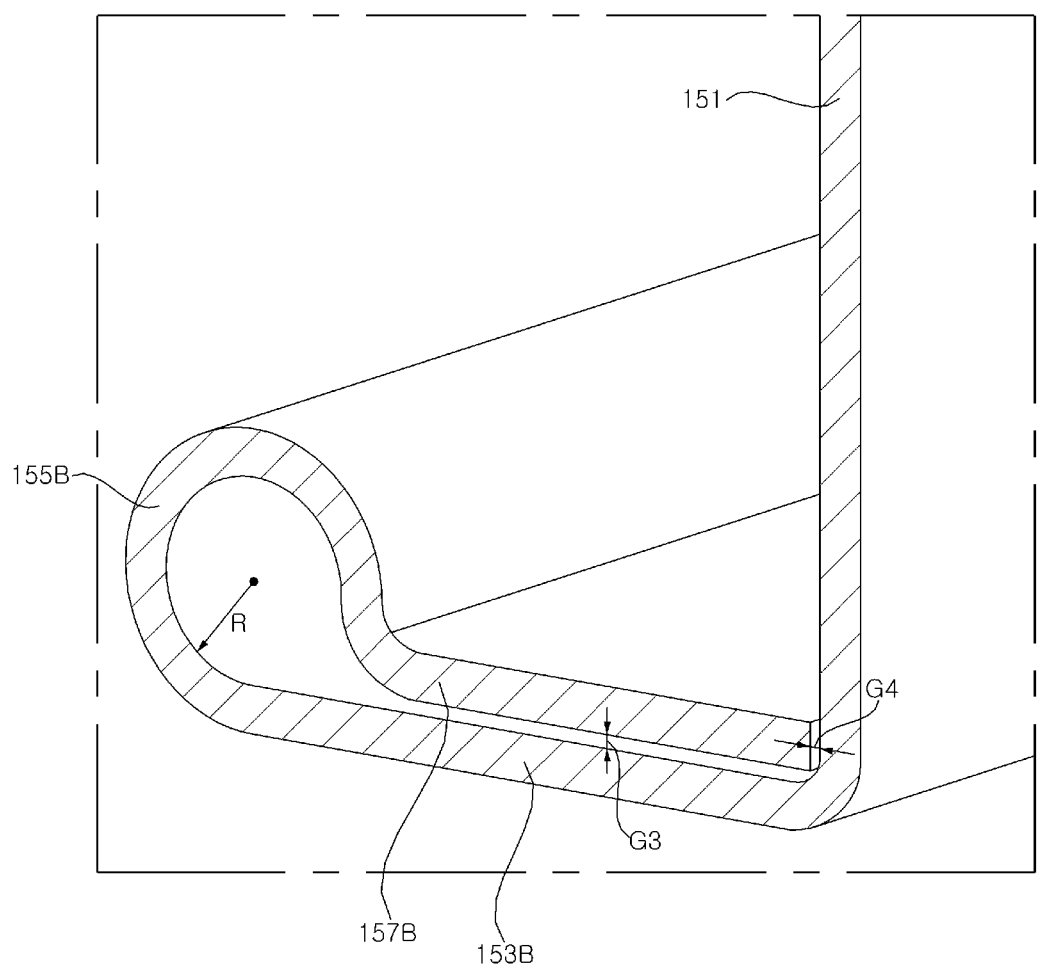

Referring to FIG. 21, the holder 300 described with reference to FIGS. 6 to 17 may be mounted adjacent to the lower side of the frame 130 in the following description.

The back cover 150 may include a base portion 151, a connecting portion 153B, a coupling portion 155B, and a reinforcing part 157B. The base portion 151 may be referred to as a first part 151, the connecting portion 153B as a second part 153B, the coupling portion 155B as a third part 155B, and the reinforcing part 157B as a fourth part 157B.

The base portion 151 may form a rear surface of the back cover 150. The connecting portion 153B may extend while being bent from the base portion 151. The connecting portion 153B may form a lower surface of the back cover 150.

The coupling portion 155B may extend while being curled from the connecting portion 153B. The coupling portion 155B may be curled from the connecting portion 153B toward the inner surface of the connecting portion 153B. The coupling portion 155B may be curled from the connecting portion 153B while drawing a circle of a constant radius R to be adjacent to the inner surface of the connecting portion 153B.

The reinforcing part 157B may be located adjacent to the inner surface of the connecting portion 153B, and may extend from the coupling portion 155B toward the base portion 151 while forming a certain gap G3 with the inner surface of the connecting portion 153B. The reinforcing part 157B may face the connecting portion 153B or may be parallel to the connecting portion 153B. A distal end of the reinforcing part 157B may form a constant gap G4 with the base portion 151. The distal end of the reinforcing part 157B may contact the inner surface of the base portion 151. The gap G4 may be smaller than the gap G3. Accordingly, the rigidity of the back cover 150 against sagging and torsion may be further improved.

Figure 22:
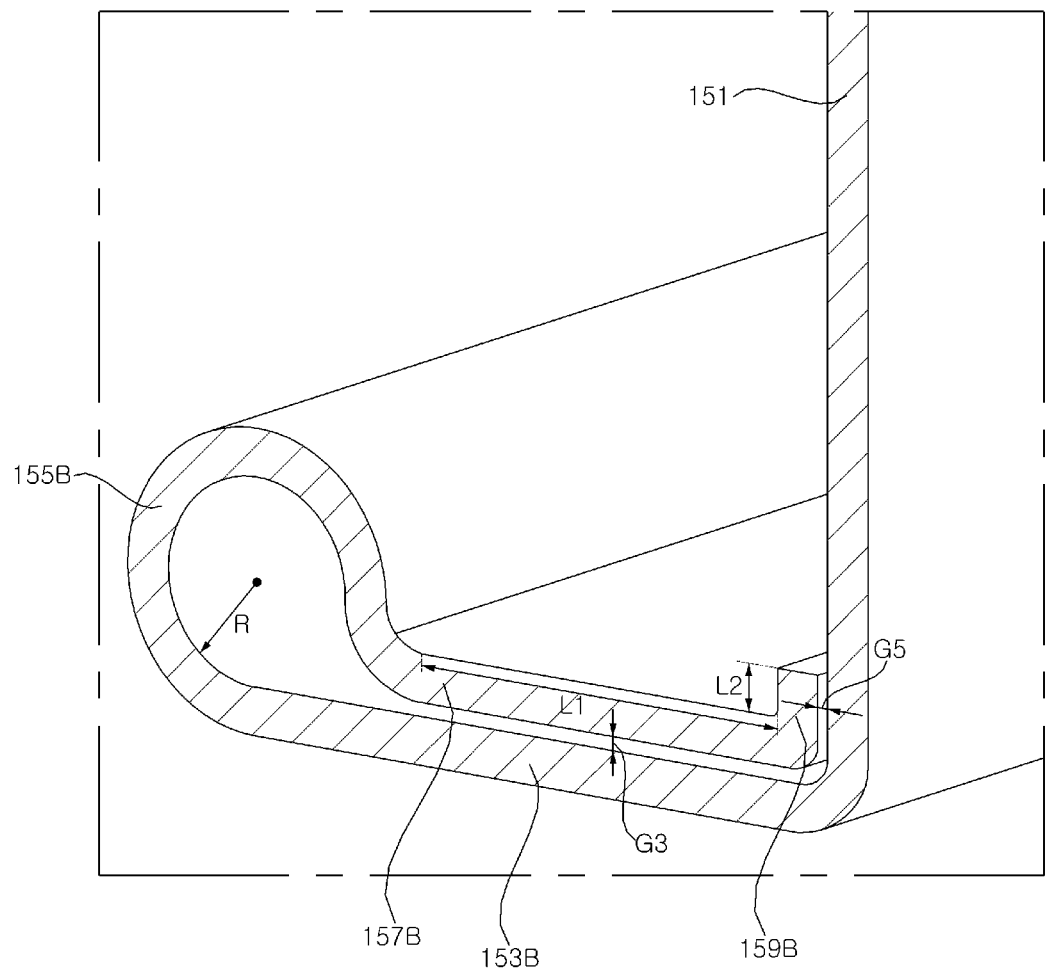

Referring to FIG. 22, the back cover 150 may include a base portion 151, a connecting portion 153B, a coupling portion 155B, a reinforcing part 157B, and a rigid part 159B. The rigid part 159B may be referred to as a fifth part 159B.

The base portion 151 may form a rear surface of the back cover 150. The connecting portion 153B may extend while being bent from the base portion 151. The connecting portion 153B may form a lower surface of the back cover 150.

The coupling portion 155B may extend while being curled from the connecting portion 153B. The coupling portion 155B may be curled from the connecting portion 153B toward the inner surface of the connecting portion 153B. The coupling portion 155B may be curled from the connecting portion 153B while drawing a circle of a constant radius R to be adjacent to the inner surface of the connecting portion 153B.

The reinforcing part 157B is located adjacent to the inner surface of the connecting portion 153B, and may extend from the coupling portion 155B toward the base portion 151 while forming a constant third gap G3 with the inner surface of the connecting portion 153B. The reinforcing part 157B may face the connecting portion 153B or may be parallel to the connecting portion 153B. The reinforcing part 157B may contact the connecting portion 153B.

The rigid part 159B may extend while being bent from the reinforcing part 157B. The rigid part 159B may face or extend parallel to the base portion 151. The rigid part 159B may extend while being bent from the reinforcing part 157B toward the base portion 151. The rigid part 159B may be located adjacent to the inner surface of the base portion 151, and may extend from the reinforcing part 157B while forming a constant fifth gap G5 with the inner surface of the base portion 151. The fifth gap G5 may be smaller than the third gap G3. The rigid part 159B may contact the base portion 151. The length L2 of the rigid part 159B may be smaller than the length L1 of the reinforcing part 157B. Accordingly, the rigidity of the back cover 150 against sagging and torsion may be further improved.

Figure 23:
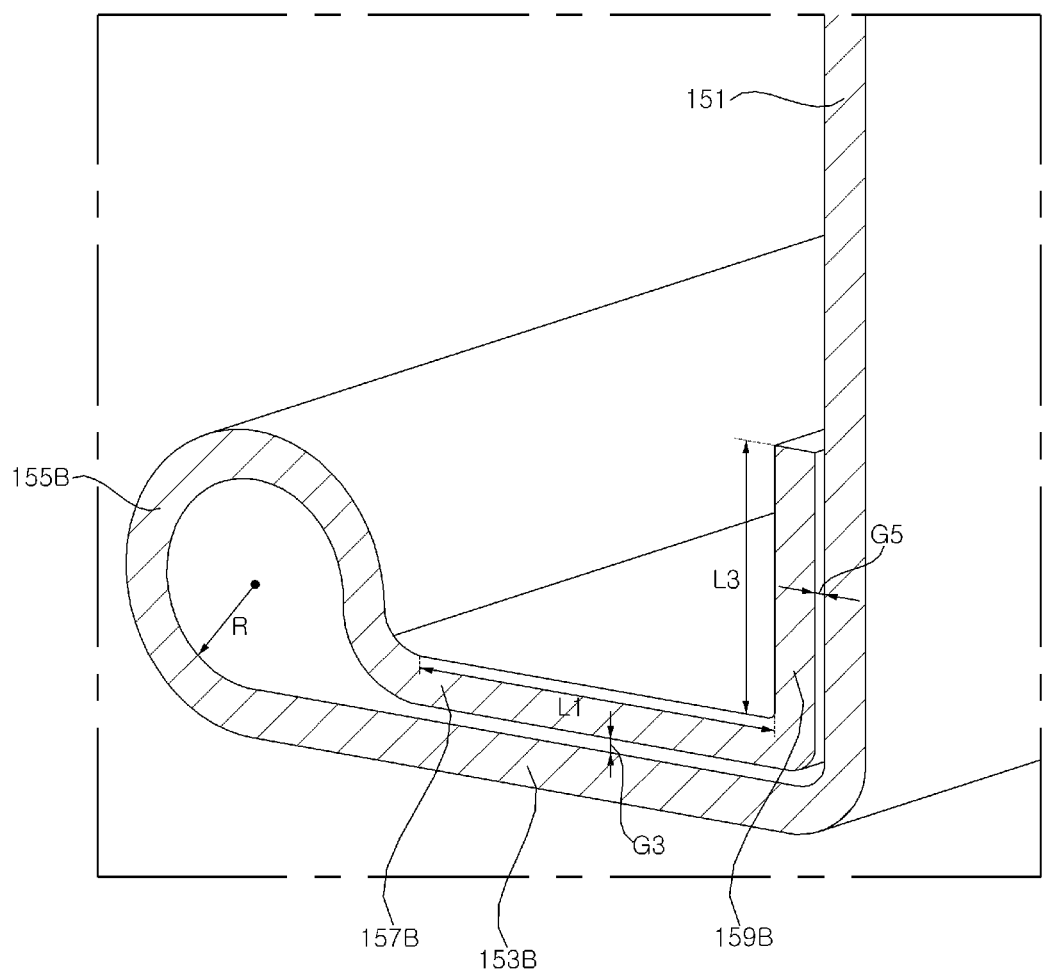

Referring to FIG. 23, the back cover 150 may include a base portion 151, a connecting portion 153B, a coupling portion 155B, a reinforcing part 157B, and a rigid part 159B.

The base portion 151 may form a rear surface of the back cover 150. The connecting portion 153B may extend while being bent from the base portion 151. The connecting portion 153B may form a lower surface of the back cover 150.

The coupling portion 155B may extend while being curled from the connecting portion 153B. The coupling portion 155B may be curled from the connecting portion 153B toward the inner surface of the connecting portion 153B. The coupling portion 155B may be curled from the connecting portion 153B while drawing a circle of a constant radius R to be adjacent to the inner surface of the connecting portion 153B.

The reinforcing part 157B may be located adjacent to the inner surface of the connecting portion 153B, and may extend from the coupling portion 155B toward the base portion 151 while forming a constant third gap G3 with the inner surface of the connecting portion 153B. The reinforcing part 157B may face the connecting portion 153B or may be parallel to the connecting portion 153B. The reinforcing part 157B may contact the connecting portion 153B.

The rigid part 159B may extend while being bent from the reinforcing part 157B. The rigid part 159B may face or extend parallel to the base portion 151. The rigid part 159B may extend while being bent from the reinforcing part 157B toward the base portion 151. The rigid part 159B may be located adjacent to the inner surface of the base portion 151 and may extend from the reinforcing part 157B while forming a constant fifth gap G5 with the inner surface of the base portion 151. The fifth gap G5 may be smaller than the third gap G3. The rigid part 159B may contact the base portion 151. The length L3 of the rigid part 159B may be less than or substantially equal to the length L1 of the reinforcing part 157B. The length L3 of the reinforcing part 157B may be greater than a height of the coupling portion 155B or a diameter 2R of the coupling portion 155B. Accordingly, the rigidity of the back cover 150 against sagging and torsion may be further improved.

Hereinafter, the display panel will be described with an OLED panel as an example, but the display panel applicable to the present disclosure is not limited to the OLED panel.

Figure 24:
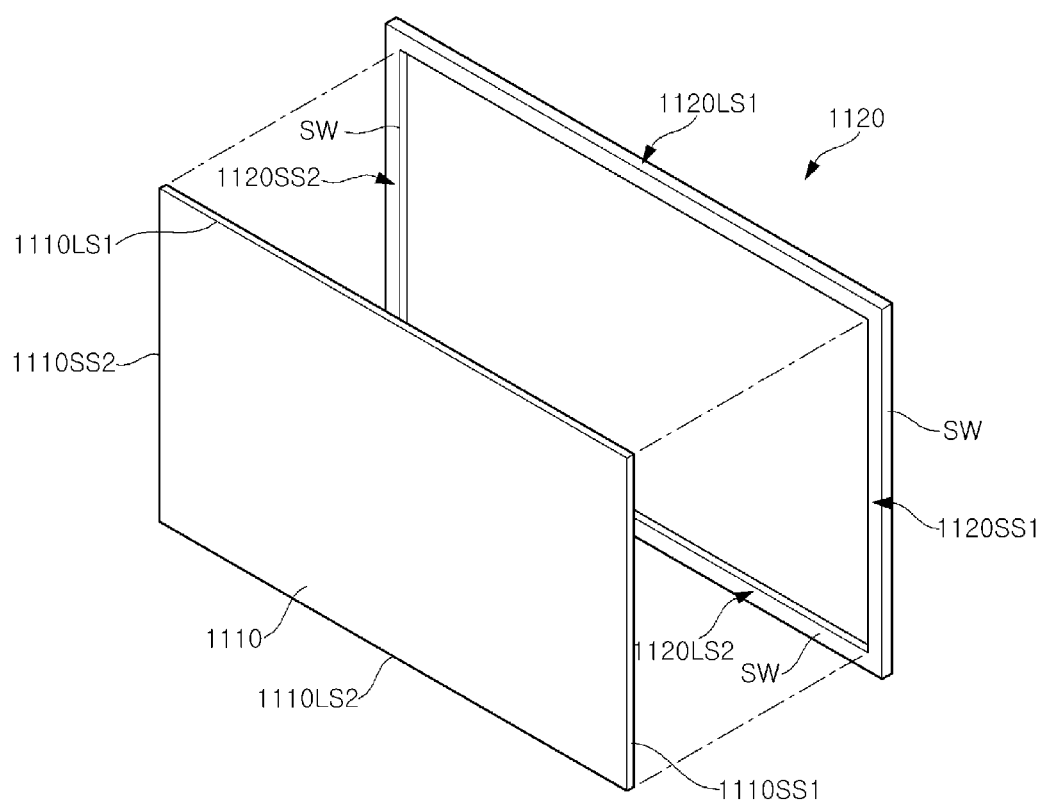

Referring to FIG. 24, a module cover may include a plate portion 1120P, and a side wall SW. The module cover 1120 may support a display panel 1110. For example, the module cover 1120 may be made of a metal material. The module cover 1120 may be a slim type or ultra-slim type metal. Accordingly, the plate portion 1120P may be made of a metal material, and may be made of a slim or ultra-slim metal. The sidewall SW may be located at an edge of the plate portion 1120P. The sidewall SW may be formed with the plate portion 1120P as one body, formed separately from the plate portion 1120P, and may be coupled to the plate portion 1120P. The sidewall SW may have a thickness greater than the thickness of the plate portion 1120P, and may be the same as the thickness of the plate portion 1120P. The module cover 1120 may be pressed to include a plate portion 1120P and a side wall SW. The area of the flat panel 1120P may correspond to the area of the display panel 1110. The sidewall SW may be located in a first long side 1120LS1, a second long side 1120LS2, a first short side 1120SS1, or a second short side 1120SS2 of the module cover 1120.

The display panel 1110 may be located in the front surface of the plate portion 1120P. The display panel 1110 may be flexible, and the display panel 1110 is located in the front surface of the plate portion 1120P to receive constant rigidity from the module cover 1120. The length of the first long side 1110LS1 of the display panel 1110 may be slightly shorter than the length of the first long side 1120LS1 of the module cover 1120. The length of the first short side 1110SS1 of the display panel 1110 may be slightly shorter than the length of the first short side 1120SS1 of the module cover 1120. The display panel 1110 may be adhered to the plate portion 1120P or inserted into the module cover 1120.

The display panel 1110 may be provided on the front surface of the display device 1100 and may display an image. The display panel 1110 may divide an image into a plurality of pixels and output an image by matching color, brightness, and saturation for each pixel. The display panel 1110 may be divided into an active area AA which displays an image and a de-active area DA which does not display an image. The display panel 1100 may generate light corresponding to a color of red, green, or blue according to a control signal.

The rigidity provided to the display panel 1110 by the module cover 1120 may vary according to the thickness of the module cover 1120.

Figure 25:
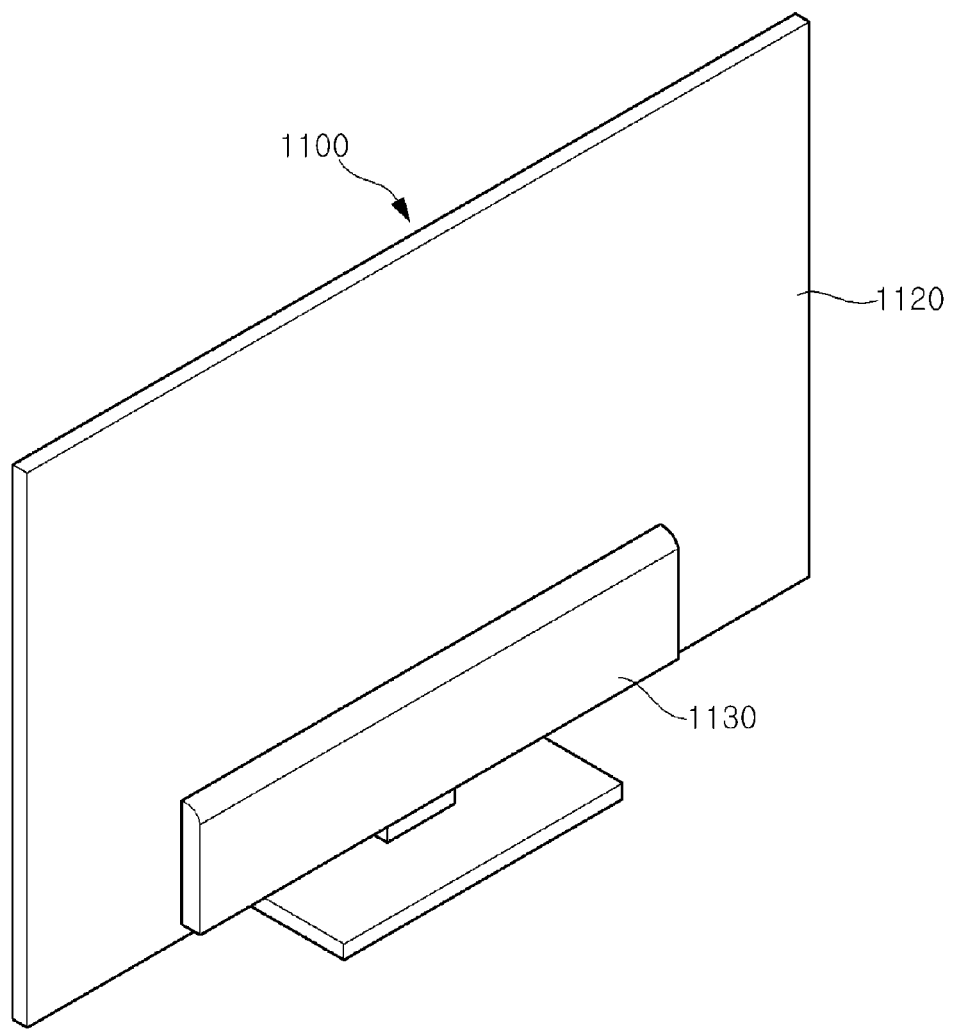

Referring to FIG. 25, the display device 1100 may include a back cover 1130. The back cover 1130 may be located in the rearward direction of the display device 1100. The back cover 1130 may be located in a portion of the rearward direction of the module cover 1120, and may cover most of the rear surface of the module cover 1120. The back cover 1130 may be formed of a synthetic resin. For example, the back cover 1130 may be located in the lower rear surface of the module cover 1120. When the back cover 1130 is located in a portion of the rearward direction of the module cover 1120, the back cover 1130 may not affect the overall thickness of the display device 1100. That is, it means that the thickness of the display device 1100 excluding the back cover 1130 may be regarded as the overall thickness of the display device 1100.

Figure 26:
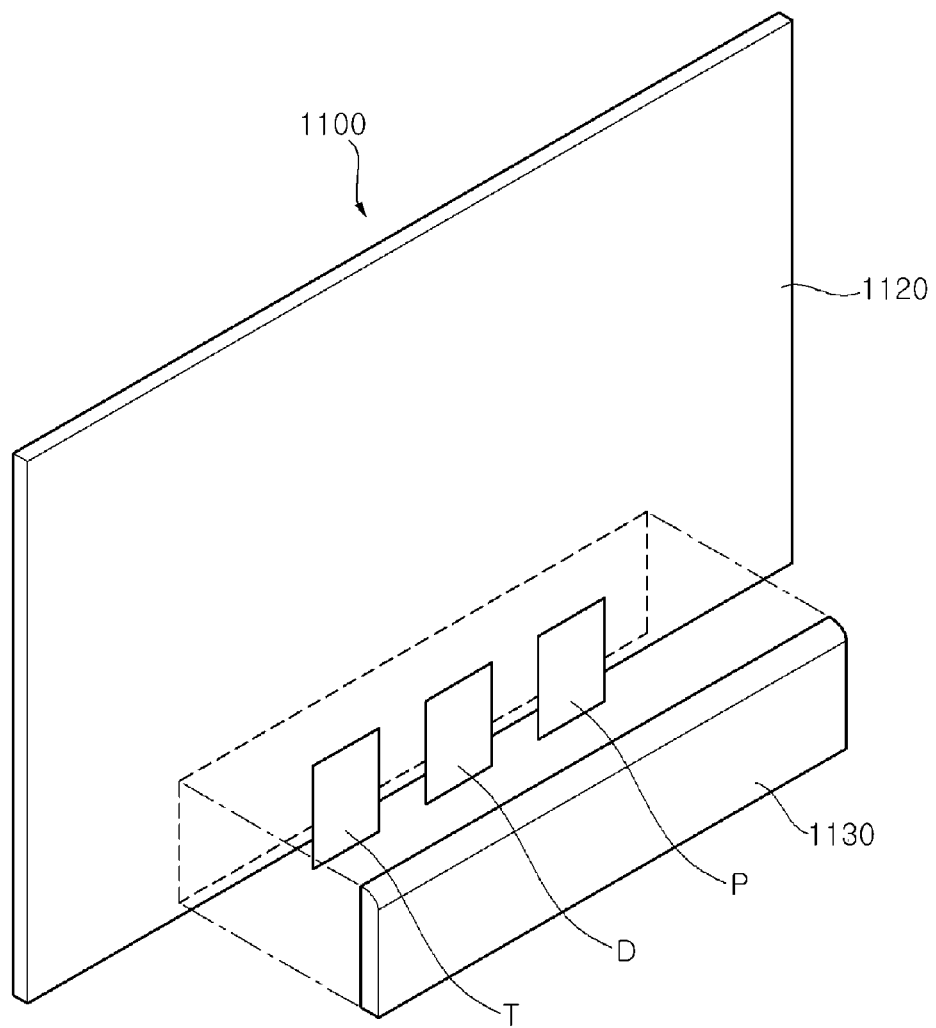

Referring to FIG. 26, the display device 1100 may include a power supply P, a driver D, and a tuner T. The power supply P may supply power to the display device 1100. The driver D may control the display of an image by the display panel 1110 provided in the display device 1100. The tuner T may receive broadcast information or external input information and provide it to the driver D. The back cover 130 may cover the power supply P, the driver D, and the tuner T.

Figure 27:
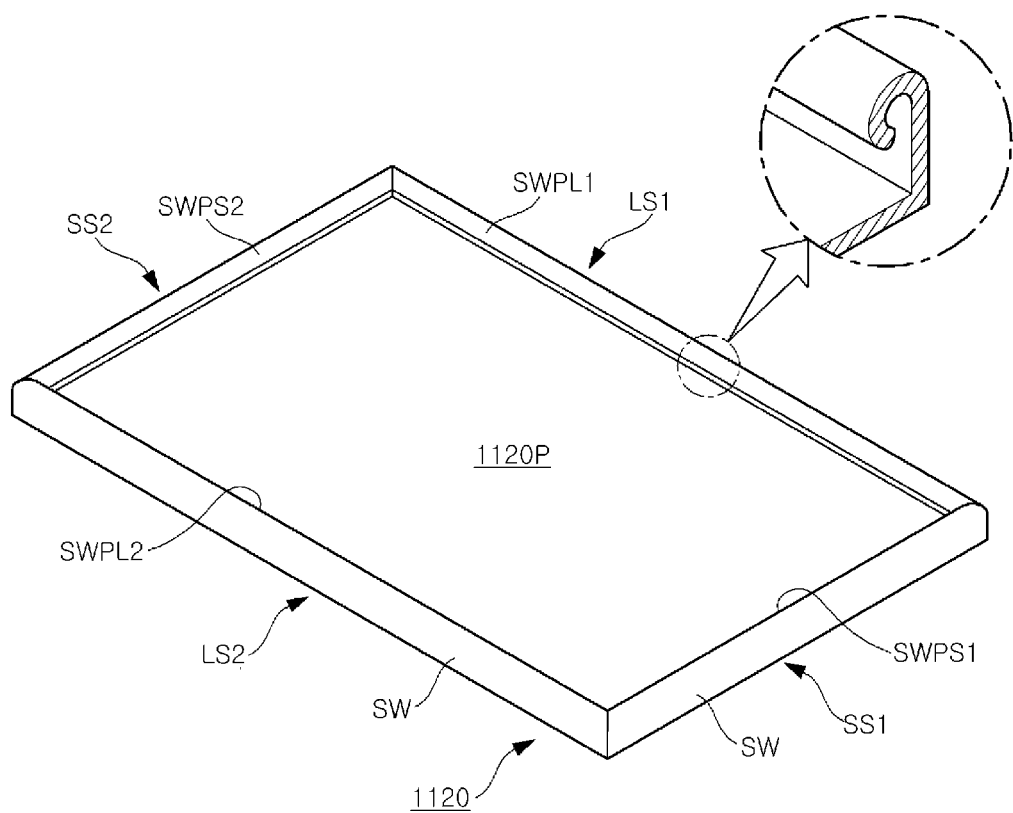

Referring to FIG. 27, a pipe SWP may be located in all four sides of the module cover 120. For example, a first long pipe SWPL1 is located in the first long side LS1, a second long pipe SWPL2 is located in the second long side LS2, a first short pipe SWPS1 may be located in the first short side SS1, and a second short pipe SWPS2 may be located in the second short side SS2. Accordingly, the overall bending or torsional rigidity of the module cover 120 may be improved.

Figure 28:
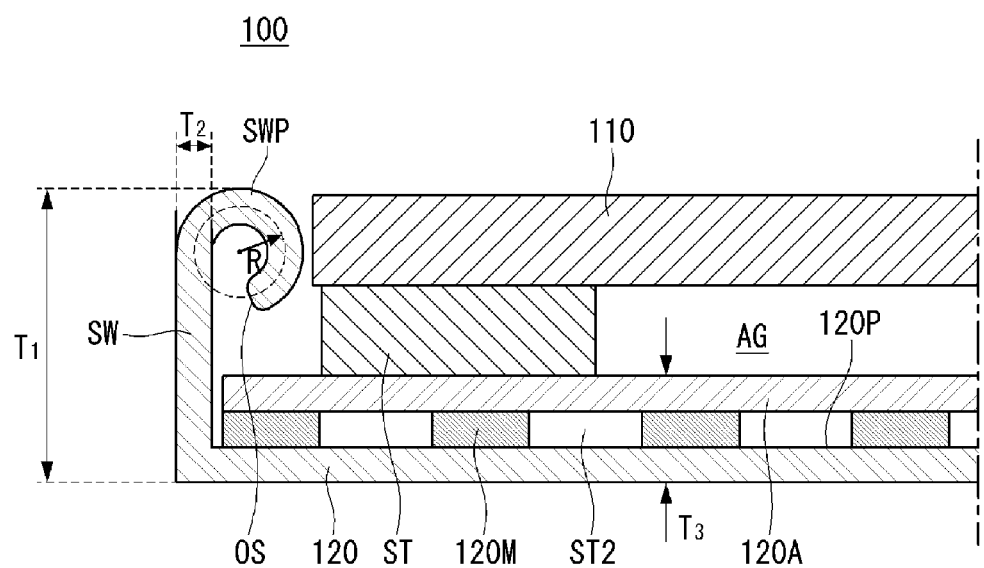

Referring to FIG. 28, an adhesive plate 1120M may be located between the module cover 1120 and the reinforcing plate 1120A. The adhesive plate 1120M may be coupled or adhered to one surface of the module cover 1120, and the reinforcing plate 1120A may be coupled or adhered to one surface of the adhesive plate 1120M. That is, the adhesive plate 1120M may more firmly couple the reinforcing plate 1120A to the module cover 1120. An adhesive ST2 may be formed between the plate portion 1120P and the reinforcing plate 1120A. The adhesive ST2 may be located in an empty space of the adhesive plate 1120M. The reinforcing plate 1120A may be referred to as a heat dissipation plate 1120A, an inner plate 1120A, or a middle cabinet 1120A.

For example, if an adhesive is applied to the plate portion 1120P, the adhesive plate 1120M is placed on it, the reinforcing plate 1120A is placed on it, and the adhesive can be naturally applied to the empty space of the adhesive plate 1120M. Accordingly, the bonding or adhesive force of the plate portion 1120P, the reinforcing plate 1120A, and the adhesive plate 1120M may be further improved. In addition, the rigidity of the module cover 1120 may be further improved. The rigidity of the module cover 1120 may include torsional rigidity as well as bending rigidity.

Accordingly, the overall rigidity of the module cover 1120 can be improved while maintaining the overall slim thickness of the display device 1100.

Figure 29:
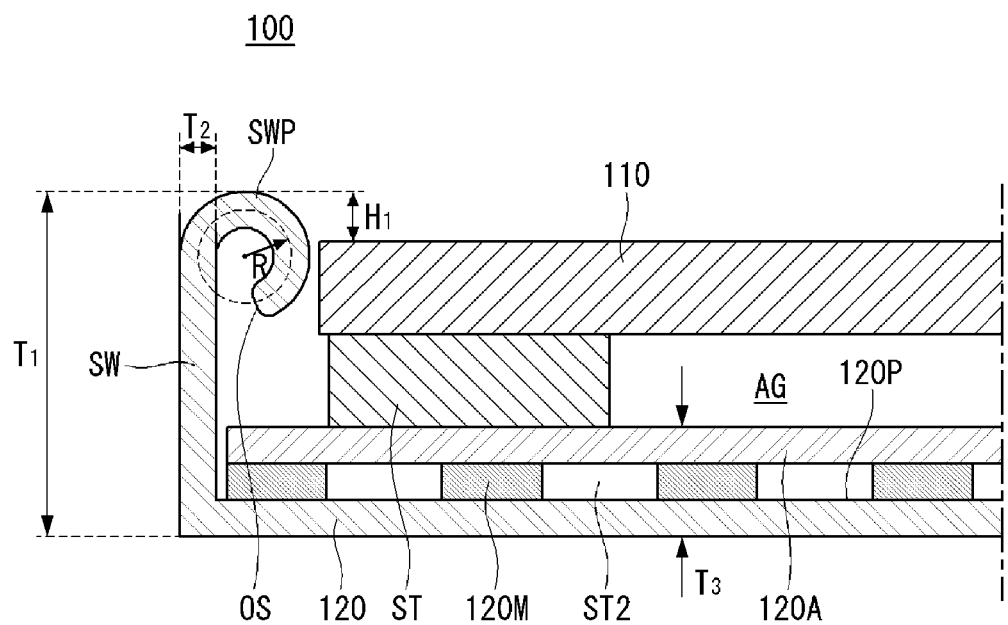

Referring to FIG. 29, one end of the sidewall SW may further protrude H1 in the forward direction of the display device 1100 than the front surface of the display panel 1110. That is, the height T1 of the sidewall SW may be greater than the sum of the display panel 1110, the adhesive member ST, and the thickness T3. Accordingly, damage to the front or side surfaces of the display panel 1110 may be prevented.

Figure 30:
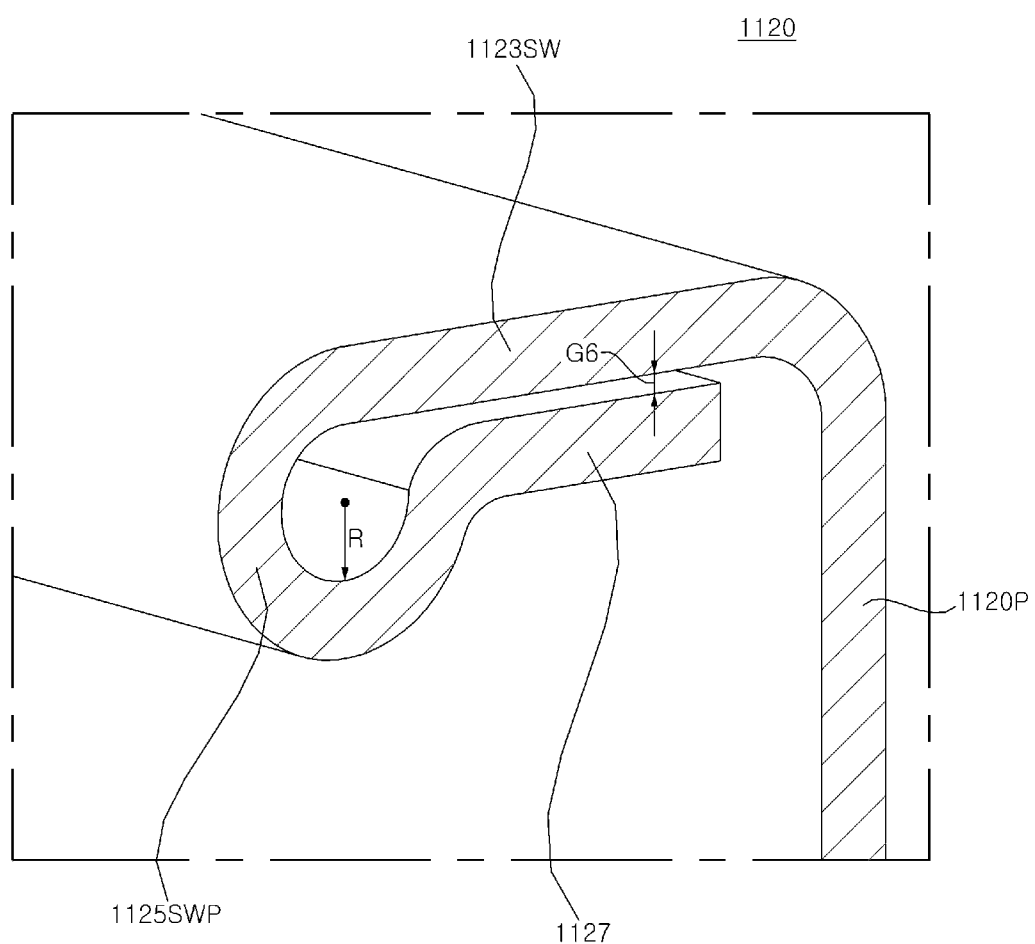

Referring to FIG. 30, the module cover 1120 may include a plate portion 1120P, a side wall 1123SW, a pipe 1125SWP, and a reinforcing part 1127. The plate portion 1120P may form the rear surface of the module cover 1120. The side wall 1123SW may extend while being bent from the plate portion 151. The side wall 1123SW may form a side surface of the module cover 1120.

The pipe 1125SWP may extend while being curled from the sidewall 1123SW. The pipe 1125SWP may be curled from the sidewall 1123SW toward the inner surface of the sidewall 1123SW. The pipe 1125SWP may be curled from the sidewall 1123SW while drawing a circle of a constant radius R to be adjacent to the inner surface of the sidewall 1123SW.

The reinforcing part 1127 may be located adjacent to the inner surface of the side wall 1123SW, and may extend from the pipe 1125SWP toward the plate portion 1120P while forming a certain gap G6 with the inner surface of the side wall 1123SW. The reinforcing part 1127 may face the sidewall 1123SW or may be parallel to the sidewall 1123SW. The reinforcing part 1127 may contact the sidewall 1123SW. Accordingly, the rigidity of the module cover 1120 against sagging and torsion may be further improved.

Figure 31:
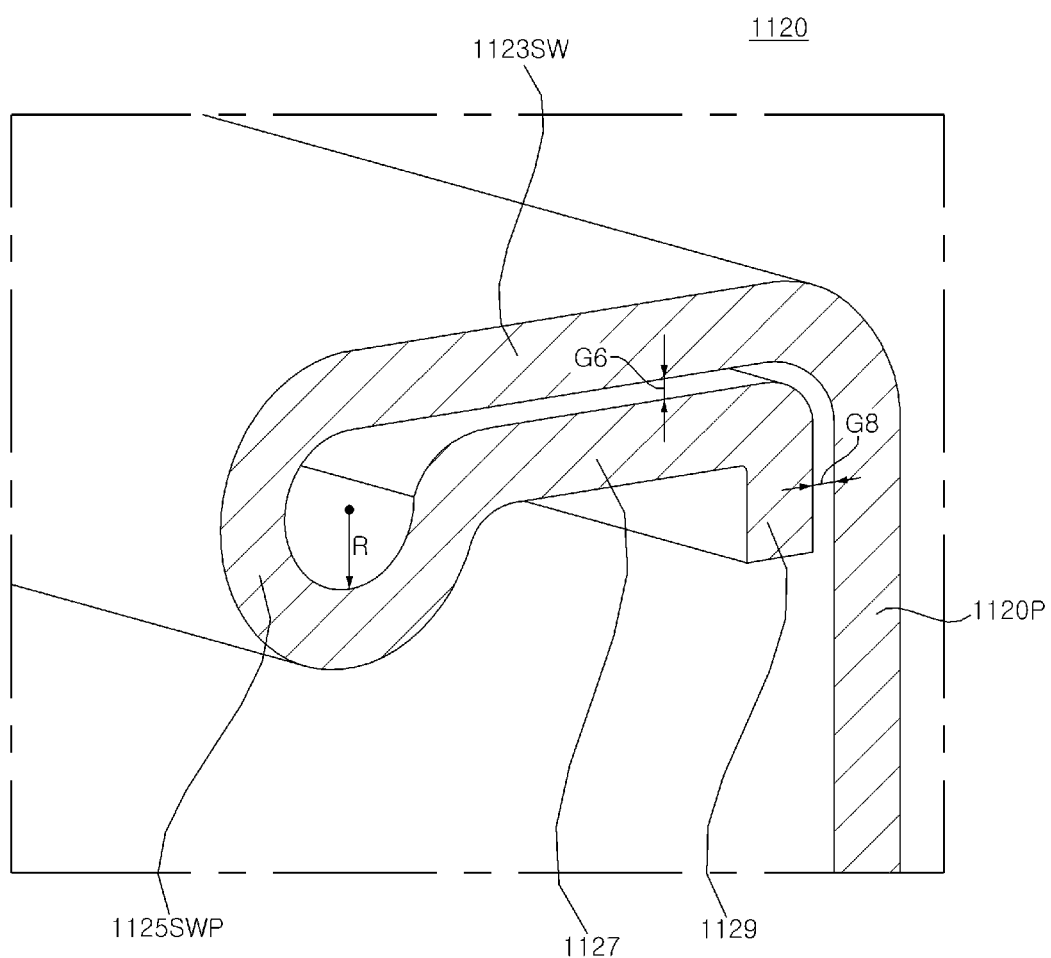

Referring to FIG. 31, the rigid portion 1129 may extend while being bent from the reinforcing part 1127. The rigid portion 1129 may face or extend parallel to the plate portion 1120P. The height of the rigid portion 1129 may be smaller than the diameter 2R of the pipe 1125SWP. The rigid portion 1129 may form a gap G8 with the plate portion 1120P. A gap G8 between the rigid portion 1129 and the plate portion 1120P may be smaller than a gap G6 between the reinforcing part 1127 and the sidewall 1123SW.

According to an aspect of the present disclosure, the display device includes a display panel; a frame which is located in a rearward direction of the display panel, and has an accommodating portion facing a rear surface of the display panel and an extension portion extending from the accommodating portion toward a side surface of the display panel; a holder fixed to a rear surface of the extension portion of the frame; and a back cover located in a rearward direction of the frame, wherein the back cover includes: a base portion facing a rear surface of the frame; a connecting portion extending from the base portion while being bent toward the holder; a coupling portion which is curled from a distal end of the connecting portion toward an inner surface of the connecting portion, and is coupled to the holder; and a reinforcing part which faces an inner surface of the connecting portion and extends from the coupling portion.

In addition, according to another aspect of the present disclosure, the holder includes: a first surface in contact with the extension portion of the frame; a second surface extending toward a rearward direction from one end of the first surface; and a fitting groove provided on the second surface, wherein the coupling portion of the back cover is inserted into the fitting groove of the holder.

In addition, according to another aspect of the present disclosure, a curvature of the coupling portion is the same as a curvature of the fitting groove.

In addition, according to another aspect of the present disclosure, the reinforcing part of the back cover is in contact with the connecting portion of the back cover.

In addition, according to another aspect of the present disclosure, the back cover further includes a rigid portion extending to face the base portion while bending from the reinforcing part, wherein the reinforcing part forms a first gap with the connecting portion, and the rigid portion forms a second gap with the base portion, wherein the second gap is smaller than the first gap.

In addition, according to another aspect of the present disclosure, the back cover further includes a rigid portion extending while bending from the reinforcing part, wherein the rigid portion forms an acute angle with respect to the base portion while being bent.

In addition, according to another aspect of the present disclosure, the reinforcing part forms a first gap, with the connecting portion, and the rigid part forms a second gap, with the connecting portion and the base portion, wherein the first gap is larger than the second gap.

In addition, according to another aspect of the present disclosure, the holder further includes a guide portion which is adjacent to the fitting groove and protrudes from the second surface, and faces the connecting portion of the back cover.

In addition, according to another aspect of the present disclosure, the holder further includes a guide surface forming an upper surface of the guide portion, wherein the guide surface is in contact with the reinforcing part of the back cover.

In addition, according to another aspect of the present disclosure, the holder includes a bending portion partitioning the guide surface so that the guide surface has a different inclination, wherein a portion of the guide surface partitioned by the bending portion is in contact with the reinforcing part of the back cover, and another portion of the guide surface partitioned by the bending portion is spaced apart from the reinforcing part of the back cover.

Certain embodiments or other embodiments of the disclosure described above are not mutually exclusive or distinct from each other. Any or all elements of the embodiments of the disclosure described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a display panel;
a frame at a rear of the display panel, the frame including an accommodating portion facing a rear surface of the display panel and an extension portion extending from the accommodating portion toward a side surface of the display panel;
a holder fixed to a rear surface of the extension portion of the frame; and
a back cover located at a rear of the frame,
wherein the back cover comprises:
a base portion facing a rear surface of the frame;
a connecting portion extending from the base portion and bent toward the holder;
a coupling portion curled from a distal end of the connecting portion toward an inner surface of the connecting portion and coupled to the holder; and
a reinforcing part which facing an inner surface of the connecting portion and extending from the coupling portion.

2. The display device of claim 1, wherein the holder comprises:
a first surface in contact with the extension portion of the frame;
a second surface extending toward a rearward direction from one end of the first surface; and
a fitting groove provided on the second surface,
wherein the coupling portion of the back cover is inserted into the fitting groove of the holder.

3. The display device of claim 2, wherein a curvature of the coupling portion is the same as a curvature of the fitting groove.

4. The display device of claim 3, wherein the reinforcing part of the back cover is in contact with the connecting portion of the back cover.

5. The display device of claim 3, wherein the back cover further comprises a rigid portion extending to face the base portion while bending from the reinforcing part,
wherein the reinforcing part forms a first gap with the connecting portion, and the rigid portion forms a second gap with the base portion,
wherein the second gap is smaller than the first gap.

6. The display device of claim 3, wherein the back cover further comprises a rigid portion extending while bending from the reinforcing part,
wherein the rigid portion forms an acute angle with respect to the base portion while being bent.

7. The display device of claim 6, wherein the reinforcing part forms a first gap, with the connecting portion, and the rigid part forms a second gap, with the connecting portion and the base portion,
wherein the first gap is larger than the second gap.

8. The display device of claim 2, wherein the holder further comprises a guide portion which is adjacent to the fitting groove and protrudes from the second surface, and faces the connecting portion of the back cover.

9. The display device of claim 8, wherein the holder further comprises a guide surface forming an upper surface of the guide portion,
wherein the guide surface is in contact with the reinforcing part of the back cover.

10. The display device of claim 9, wherein the holder comprises a bending portion partitioning the guide surface so that the guide surface has a different inclination,
   wherein a portion of the guide surface partitioned by the bending portion is in contact with the reinforcing part of the back cover, and
   another portion of the guide surface partitioned by the bending portion is spaced apart from the reinforcing part of the back cover.

* * * * *